US011721217B2

(12) United States Patent
Wiegman

(10) Patent No.: US 11,721,217 B2
(45) Date of Patent: Aug. 8, 2023

(54) SYSTEMS AND METHODS FOR SWARM COMMUNICATION FOR AN ELECTRIC AIRCRAFT FLEET

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/574,919

(22) Filed: Jan. 13, 2022

(65) Prior Publication Data

US 2023/0222920 A1 Jul. 13, 2023

(51) Int. Cl.
G08G 5/00 (2006.01)
B64C 29/00 (2006.01)
H04W 84/18 (2009.01)
H04B 7/185 (2006.01)

(52) U.S. Cl.
CPC ....... *G08G 5/0008* (2013.01); *B64C 29/0008* (2013.01); *H04B 7/18506* (2013.01); *H04W 84/18* (2013.01)

(58) Field of Classification Search
CPC .............. G08G 5/0008; B64C 29/0008; H04B 7/18506; H04W 84/18
See application file for complete search history.

(56) References Cited

U.S. PATENT DOCUMENTS

| 9,858,822 | B1 | 1/2018 | Gentry | |
|---|---|---|---|---|
| 9,928,553 | B1* | 3/2018 | Harvey | G06Q 40/08 |
| 9,971,355 | B2* | 5/2018 | Smith | H04W 4/40 |
| 10,841,744 | B2 | 11/2020 | Patil et al. | |
| 2015/0274315 | A1* | 10/2015 | Conrad | B64D 45/00 701/31.9 |
| 2016/0342920 | A1* | 11/2016 | Tucker | G06Q 10/06316 |
| 2016/0342930 | A1* | 11/2016 | Tucker | G06Q 10/063118 |
| 2016/0342956 | A1* | 11/2016 | Tucker | G06Q 10/20 |
| 2016/0343044 | A1* | 11/2016 | Tucker | G06Q 10/20 |
| 2017/0069214 | A1* | 3/2017 | Dupray | H04B 7/18506 |
| 2017/0094527 | A1* | 3/2017 | Shattil | H04K 3/45 |
| 2018/0007518 | A1 | 1/2018 | O'Berry et al. | |

(Continued)

FOREIGN PATENT DOCUMENTS

WO 2021056080 4/2021

*Primary Examiner* — Mussa A Shaawat
(74) *Attorney, Agent, or Firm* — Caldwell Intellectual Property Law

(57) ABSTRACT

A system for swarm communication for an electric aircraft fleet, wherein the system includes a plurality of electric aircrafts connected by a mesh network. The system further includes a computing device communicatively connected to the mesh network, wherein the computing device includes an authentication module configured to authenticate each electric aircraft and facilitate communication of a plurality of aircraft data between the plurality of electric aircrafts. The computing device includes a plurality of communication components, each assigned to an electric aircraft of the electric aircraft fleet, wherein each communication component is configured to transmit the aircraft data to the communication component of its assigned electric aircraft. The system further includes a cloud database configured to record the plurality of aircraft data.

20 Claims, 12 Drawing Sheets

(56) References Cited

U.S. PATENT DOCUMENTS

| | | | |
|---|---|---|---|
| 2018/0015347 A1* | 1/2018 | Janssen | A63B 69/00 |
| 2018/0181117 A1* | 6/2018 | Rosenberg | H04L 65/403 |
| 2018/0322749 A1* | 11/2018 | Kempel | G05D 1/0094 |
| 2019/0025817 A1* | 1/2019 | Mattingly | H04L 9/0825 |
| 2019/0049931 A1* | 2/2019 | Tschirschnitz | G05B 19/4186 |
| 2019/0050269 A1* | 2/2019 | Anderson | G06F 9/5077 |
| 2019/0068382 A1* | 2/2019 | Theodore | H04W 12/06 |
| 2019/0392717 A1* | 12/2019 | Vaughn | G08G 5/006 |
| 2020/0007384 A1 | 1/2020 | Mueck et al. | |
| 2020/0043348 A1* | 2/2020 | Ghosh | G08G 5/0052 |
| 2020/0117900 A1* | 4/2020 | Deng | H04W 4/38 |
| 2020/0372807 A1 | 11/2020 | Li et al. | |
| 2021/0209956 A1* | 7/2021 | Allouche | B64C 39/024 |
| 2021/0274594 A1 | 9/2021 | Jakusz et al. | |
| 2021/0286655 A1* | 9/2021 | Liu | G06F 9/5083 |
| 2021/0343154 A1* | 11/2021 | Faccin | G08G 5/0008 |
| 2021/0349478 A1* | 11/2021 | Bigdeli | G08G 5/0091 |

\* cited by examiner

SYSTEMS AND METHODS FOR SWARM COMMUNICATION FOR AN ELECTRIC AIRCRAFT FLEET

FIELD OF THE INVENTION

The present invention generally relates to the field of aircraft communication. In particular, the present invention is directed to systems and methods for swarm communication for an electric aircraft fleet.

BACKGROUND

In the operation of an electric aircraft, communication between the pilot of the electric aircraft and one or more parties is vital. A reliable network may aid in connecting multiple flying electric aircrafts with each other.

SUMMARY OF THE DISCLOSURE

In an aspect, a system for swarm communication for an electric aircraft fleet is presented. The system includes a plurality of electric aircrafts. The system further includes a mesh network, wherein the mesh network is configured to connect the plurality of electric aircrafts to each other. The system further includes a computing device communicatively connected to the mesh network, wherein the computing device includes an authentication module configured to authenticate each electric aircraft, a plurality of communication components, wherein each communication component is configured to receive a plurality of aircraft data and. facilitate communication between the plurality of electric aircrafts, and a cloud database configured to record the plurality of aircraft data.

In another aspect, a method for swarm communication for an electric aircraft fleet is presented, the method includes connecting, as a function of a mesh network, a plurality of electric aircrafts with each other, authenticating, by an authentication module of a computing device, each electric aircraft, receiving, by a communication component of a plurality of communication components, a plurality of aircraft data, facilitating, as a function of the plurality of communication components communication between the plurality of electric aircrafts, and recording, by a cloud database, the plurality of aircraft data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
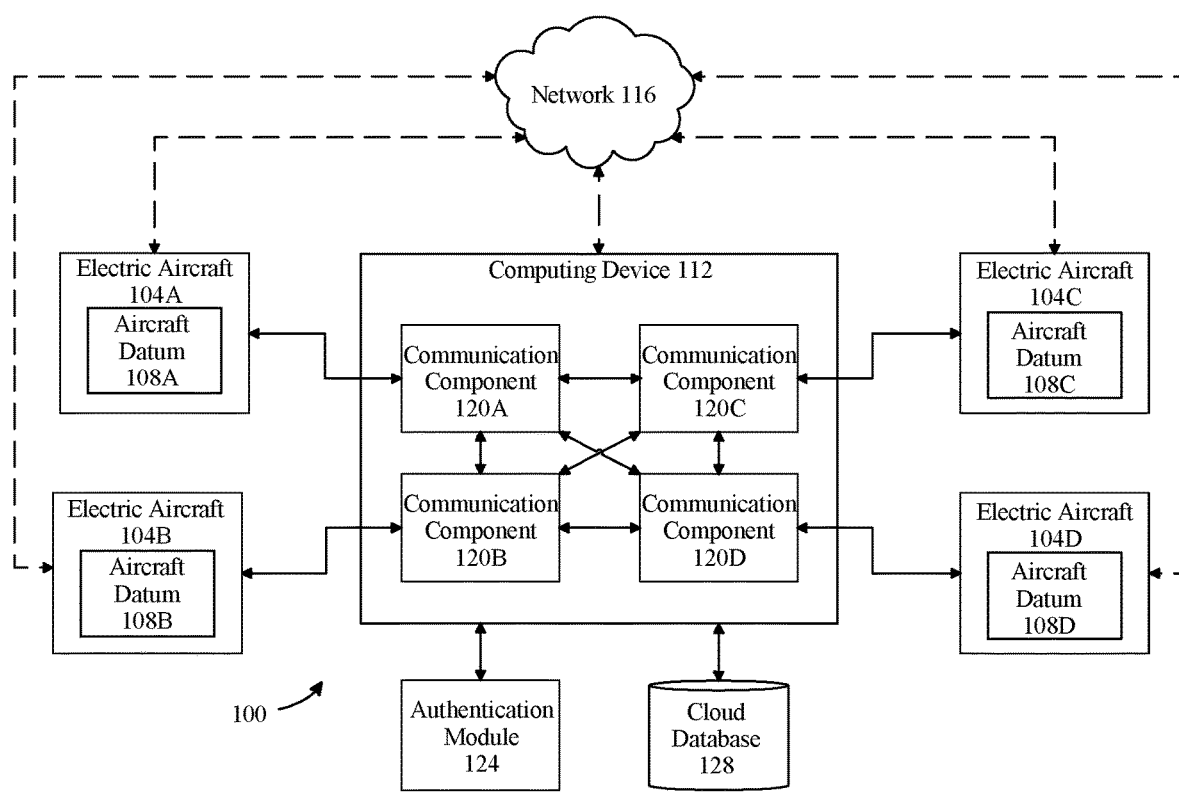
FIG. 1 is a block diagram of an exemplary embodiment of a system for swarm communication for electric aircraft fleet.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for swarm communication for an electric aircraft fleet. In an embodiment, the electric aircraft fleet may include a plurality of electric aircrafts, including, an electric vertical take-off and landing (eVTOL) aircraft. In an embodiment, a mesh network may connect a fleet of electric aircrafts to each other. This is so, at least in part, to connect a plurality of electric aircrafts of the same fleet to each other to allow for inter-aircraft or intra-aircraft communication and transfer of aircraft data.

Aspects of the present disclosure can be used to connect nearby electric aircrafts to the network, wherein the nearby electric aircrafts are part of the same fleet. Aspects of the present disclosure can also be used to deny an aircraft the access to the network of a fleet in the event the aircraft is not part of that fleet and/or fleet's network. This is so, at least in part, because the aircraft may be an unauthorized aircraft or a suspicious aircraft. Aspects of the present disclosure can be used to provide security measures for a network used for a fleet of electric aircraft and communication.

Aspects of the present disclosure allow for communicating data between electric aircrafts of a fleet using a hub of communication components. In a non-limiting embodiment, the communication components may include any transceiver. In a non-limiting embodiment, the hub may include a plurality of communication components which are to be assigned to each electric aircraft of the fleet of electric aircrafts. In an embodiment, the hub may assign a communication component to a unique electric aircraft. In another embodiment, the hub may assign the communication component to a new electric aircraft in the event its originally assigned electric aircraft is disassociated with the fleet. In another embodiment, the hub may incorporate a mesh network and assign a node of the mesh network to a communication component. The mesh network may generate additional nodes for additional electric aircrafts being added to the fleet, and therefore the communication network for the fleet, wherein the generated node is to be associated with a new communication component. Aspects of the present disclosure may assign any communication component to an electric aircraft and/or node as it sees fit.

Referring now to FIG. 1, an exemplary embodiment of a system 100 for swarm communication for an electric aircraft fleet is illustrated. System includes a computing device 112. In a non-limiting embodiment, computing device 112 may include a flight controller. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 112 may include a communication hub. A "communication hub," for the purpose of this disclosure, is any software/hardware or any module configured to control a network and communicate any electric aircraft 104 with each other. In a non-limiting embodiment, system 100 may include a network 116 that may work in tandem with computing device 112 to facilitate communication with a plurality of electric aircrafts 104 of an electric aircraft fleet. In another non-limiting embodiment, the communication hub may be configured to support digital communication. A "digital communication," for the purposes of this disclosure, refer to a mode of transfer and reception of data over a communication channel via digital signals. Digital signals may include, but not limited to, audio signals, electrical signals, video signals, radar signals, radio signals, sonar signals, transmission signals, LIDAR signals and the like thereof. Digital communication may include, but not limited to, data transmission, data reception, a communication system, and the like. A communication system that may support digital communication may include a plurality of individual telecommunications networks, transmission systems, relay stations, tributary stations, and the like. In a non-limiting embodiment, computing device 112 may be configured to transfer data such as a plurality of aircraft data 108 over a point-to-point or point-to-multipoint communication channels which may include, but not limited to, copper wires, optical fibers, wireless communication channels, storage media, computer buses and the like. The data being transmitted may be represented as, but not limited to, electromagnetic signals, electrical voltage, radio wave, microwave, infrared signals, and the like. In a non-limiting embodiment, transmission of data via digital communication may be conducted using any network methodology as understood by a person of ordinary skill in the art. In a non-limiting embodiment, each electric aircraft 104 of the fleet may encrypt its respective aircraft data 108 before transmitting it to another party such as another electric aircraft and/or computing device 112. Computing device 112 may be configured to decrypt aircraft data 108 received, confirm the identity of the electric aircraft of both the sender and recipient of the aircraft data, which could be another electric aircraft, and transmit the aircraft data to the recipient. For example and without limitation, electric aircraft 104A may want to transmit its aircraft data 108A to electric aircraft 104D, in which the transmission is completed through computing device 112 and its communication components 120. Persons skilled in the art, upon reviewing the entirety of this disclosure, will be aware of the using encryption and decryption methodologies in the context of transferring data between electric aircrafts.

The translated data my include a collection of data to be viewed, analyzed, and/or manipulated by a computing device 112 and/or a user/pilot. In a non-limiting embodiment, any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

A person of ordinary skill in the art, after viewing the entirety of this disclosure, would appreciate the transmission of data in the context of network methodologies and digital communication.

With continued reference to FIG. 1, computing device 112 may include a plurality of physical controller area network buses. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. For instance and without limitation, CAN bus unit may be consistent with disclosure of CAN bus unit in U.S. patent application Ser. No. 17/218, 342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. In a non-limiting embodiment, computing device 112 may include a plurality of physical CAN bus units wherein each physical CAN bus unit is configured to receive an aircraft data from an electric aircraft, wherein each physical CAN bus unit is associated with receiving datum from that specific electric aircraft. In some embodiments, computing device 112 may assign a physical CAN bus unit to a unique electric aircraft of the fleet.

Still referring to FIG. 1, computing device 112 may include a plurality of controller area network gateways connected to the plurality of physical CAN bus units. A "controller area network gateway," as used in this disclosure, is a piece of networking hardware used for transmission of data signals from one discrete network to another. In a non-limiting embodiment, the CAN gateways may include routers and/or switches which may provide interoperability between physical CAN bus units communicatively connected with the electric aircrafts and switches, such as Ethernet switches, wherein the intraoperatively may include the transmission of aircraft data 108 between the electric aircrafts and the Ethernet switch. In a non-limiting embodiment, computing device 112 may include at least a network switch communicatively connected to the plurality of controller area network gateways configured to receive the transmitted measured state data and transmit the measured state data via a transmission signal. A "network switch," as used in this disclosure, is a networking hardware that connects devices on a computer network using packet switching to receive and forward data to a destination device. A network switch may include an Ethernet hub switch, which may be used for Fiber Channel.

Continuing in reference to FIG. 1, a transmission signal of aircraft data 108 from a physical CAN bus unit located at aircraft may be transmitted to a virtual CAN bus, and/or virtual CAN bus unit. For instance and without limitation, the virtual CAN bus unit may be consistent with the virtual CAN bus unit in U.S. patent application Ser. No. 17/218, 342. In a non-limiting embodiment, computing device 112 may additionally include or be configured to perform operations functioning a virtual controller area network. virtual CAN bus unit may be configured to demultiplex an incoming transmission signal into a plurality of outgoing messages originating from the plurality of physical controller area network buses. Demultiplexing may include processes of reconverting a transmission signal containing, for example containing multiple analogue and/or digital signal streams from at electric aircraft 104 and/or computing device 112, back into original separate and unrelated signals originally relayed from controller area network. Demultiplexing may include extracting original channels on a receiving end to identify which physical CAN bus unit a signal originates from. Demultiplexing may be performed using a demultiplexer such as a binary decoder, or any programmable logic device. Demultiplexing may be performed using a computing software operating on the virtual CAN bus unit, which may deconvolute a signal.

Still referring to FIG. 1, system 100 may include a plurality of electric aircrafts. In a non-limiting embodiment, the electric aircraft may include an electric vertical take-off and landing (eVTOL) aircraft, a drone, an unmanned aerial vehicle (UAV), etc. In a non-limiting embodiment, system 100 may include electric aircrafts 104A-D, wherein each electric aircraft 104 is configured to transmit their respective aircraft data 108A-D to computing device 112. An "aircraft data," for the purpose of this disclosure, is a collection of information generated by an electric aircraft describing any information involving the electric aircraft and/or captured by the electric aircraft. In a non-limiting embodiment, aircraft data 108 may include a component state data. A "component state data," for the purposes of this disclosure, is an element of data describing the status or health status of a flight component or any component of an electric aircraft. A "flight component", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. The component state data may include information such as, but not limited to, an aircraft flight duration, a distance of the aircraft flight, a plurality of distances of an aircraft from the surface, and the like. The component state data may denote a location of the aircraft, status of the aircraft such as health and/or functionality, aircraft flight time, aircraft on frame time, and the like thereof. In a non-limiting embodiment, component state data may include aircraft logistics of an electric aircraft of a plurality of electrical aircraft. An "aircraft logistics," for the purposes of this disclosure, refer to a collection of datum representing any detailed organization and implementation of an operation of an electric aircraft. In a non-limiting embodiment, aircraft logistics may include unique identification numbers assigned to each electric aircraft. In a non-limiting embodiment, aircraft logistics may include a historical record of locations corresponding to an electric aircraft that may represent the aircraft's destination or potential destination. Aircraft logistics may include time an electric aircraft was in the air and a historical record of the different rate of velocity the aircraft may have commanded. In a non-limiting embodiment, the component state data may include a history of health information of an electric aircraft. In a non-limiting embodiment, a history of an electric aircraft's health may be measured with the ability to be presented in a visual format to a user.

With continued reference to FIG. 1, aircraft data 108 may include a payload data. A "payload data," for the purposes of this disclosure, is describes the cargo of an electric aircraft. payload data 112 may include information describing the logistics or aircraft logistics of a commercial application of the at least an electric aircraft. In a non-limiting embodiment, payload data 112 may include information about, but not limited to, the delivery location, the pickup location, the type of package and/or cargo, the priority or the package, and the like thereof. A person of ordinary skill in the art, after viewing the entirety of this disclosure, would appreciate the multitude of information for a payload data.

Still referring to FIG. 1, aircraft data 108 may include a pilot data. A "pilot data," for the purposes of this disclosure, is an element of data describing the state of information of a pilot of an electric aircraft. The pilot data may include any datum that refers to at least an element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. A person of ordinary skill in the art, after viewing the entirety of this disclosure, would appreciate the monitoring and mapping of a pilot's movements and actions for purposes as described herein.

With continued reference to FIG. 1, system 100 may include a network 116 configured to connect the plurality of electric aircrafts 104 to each other and communicate with each other as a function of computing device 112. A "network", for the purpose of this disclosure, is any medium configured to facilitate communication between two or more devices. Network 116 may include any mesh network described in this disclosure, for example without limitation an avionic mesh network. For instance and without limitation, the avionic mesh network may be consistent with the avionic mesh network in U.S. patent application Ser. No. 17/348,916 and entitled "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. In a non-limiting embodiment, network 116 may include a central mesh network and a plurality of local mesh networks. A "central mesh network," as used in this disclosure, is a mesh network used by a fleet of electric aircrafts, wherein each node of the central mesh network includes an entity that is associated with the fleet. Any mesh network may include a computing device configured to generate nodes to its mesh network. In a non-limiting embodiment, each node of the central mesh network may include any electric aircraft of the same fleet and any entity such as, but not limited to, a ground station associated with the fleet, a fleet manager of the fleet of electric aircrafts operating a remote device, and the like thereof. A "local mesh network," as used in this disclosure, is a mesh network created by the computing device of an electric aircraft of the fleet, wherein the electric aircraft is the central node of its local mesh network. In a non-limiting embodiment, each electric aircraft may be the central node if its respective local mesh network. This is so, at least in part, because an electric aircraft of the fleet may detect other entities not associated with the fleet such as, but not limited to, other aircrafts, an air traffic control authority, and the like thereof, that the central mesh network of the fleet may not be in range of detecting the other entities. The central mesh network and/or the local mesh network may include some security program such as authentication module 124 to authorize some level of communication between the electric aircraft and the other entities. In a non-limiting embodiment, the central mesh network may authenticate the other entities and generate additional nodes into the central mesh network temporarily. In another non-limiting embodiment, the central mesh network may merge with the plurality of local mesh networks. Alternatively or additionally, the central mesh network may be a merge of the plurality of local mesh networks. In some embodiments, the central mesh network may generate the additional nodes and integrate them into the central mesh network and delete those nodes. The central mesh network may only temporarily generate the additional nodes to allow for any data the central mesh network may have to be sent over to the other entities via the additional nodes. The central mesh network may then delete those nodes once communication is complete. The central mesh network may include a central node, which may be a ground station associated with the fleet and/or a fleet manager, wherein the range of the central mesh network originates from the position of the central node. Persons skilled in the art, upon reviewing the entirety of this disclosure, will be aware of various levels of access of nodes and data for purposes as described herein.

In a non-limiting embodiment, network 116 may be configured to identify any nearby electric aircraft. Network 116 and/or computing device 112 may be configured to identify if the nearby electric aircraft is part of the fleet of electric aircrafts associated with computing device 112 and/or network 116 via an authentication module 124. An "authentication module," for the purpose of this disclosure, is a hardware and/or software module configured to authenticate an electric aircraft and/or user associated with the electric aircraft. In a non-limiting embodiment, computing device 112 may be configured to establish a connection with between the plurality of electric aircrafts of the electric aircraft fleet, via network 116 or any radio frequency or Bluetooth connection using authentication module 124. In a non-limiting embodiment, authentication may be performed automatically via authentication module 124. In a non-limiting embodiment, authentication may be performed manually by a fleet manager using a remote user device comprising computing device 112. A "fleet manager," for the purpose of this disclosure, is an authoritative figure configured to monitor, manage, and/or supervise the network communication of an electric aircraft fleet assigned to the fleet manager. A "remote user device," for the purpose of this disclosure, is a computing device that includes an interactive device and graphical user interface (GUI). The remote user device may be used as an interactive platform that may provide visualization of the fleet communication and aircraft data 108 being transferred. The remote user device may be used to monitor and verify additional electric aircrafts of the fleet into network 116. Persons skilled in the art, upon reviewing the entirety of this disclosure, will be aware of the management of the electric aircraft fleet communication by a fleet manager for authentication purposes as described herein.

In a non-limiting embodiment, computing device 112 may be configured to compare the credential from user device to an authorized credential stored within an authentication database, and bypass authentication for user device based on the comparison of the credential from user device to the authorized credential stored within the authentication database. A "credential" as described in the entirety of this disclosure, is any datum representing an identity, attribute, code, and/or characteristic specific to a user, a user device, and/or an electric aircraft. For example and without limitation, the credential may include a username and password unique to the user, the user device, and/or the electric aircraft. The username and password may include any alpha-numeric character, letter case, and/or special character. As a further example and without limitation, the credential may include a digital certificate, such as a PKI certificate. The remote user device and/or the electric aircraft may include an additional computing device, such as a mobile device, laptop, desktop computer, or the like; as a non-limiting example, the user device may be a computer and/or smart phone operated by a pilot-in-training at an airport hangar. The remote user device and/or electric aircraft may include, without limitation, a display in communication with computing device 112; the display may include any display as described in the entirety of this disclosure such as a light emitting diode (LED) screen, liquid crystal display (LCD), organic LED, cathode ray tube (CRT), touch screen, or any combination thereof. Output data from computing device 112 may be configured to be displayed on user device using an output graphical user interface. An output graphical user interface may display any output as described in the entirety of this disclosure. As a further embodiment, authentication module 124 and/or computing device 112 may be configured to receive a credential from an admin device. The admin device may include any additional computing device as described above in further detail, wherein the additional computing device is utilized by/associated with an employee of an administrative body, such as an employee of the federal aviation administration.

With continued reference to FIG. 1, computing device 112 may include a flight simulator operating on computing device 112, wherein the flight simulator is configured to generate an aircraft data model representing aircraft data 108 that is being transmitted. As used in this disclosure, a "flight simulator" is a program or set of operations that simulates a visual representation of an electric aircraft and its aircraft data. The flight simulator may be consistent with the flight simulator in U.S. patent application Ser. No. 17/218,312 and entitled, "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. An "aircraft data model," for the purpose of this disclosure, is any model a simulated model depicting the electric aircraft and/or any aircraft data. This is so, at least in part, to provide a visual representation of data collected by the electric aircraft that is easily understood and analyzed by a pilot of the electric aircraft receiving the aircraft data and/or the fleet manager utilizing the remote user device. In a non-limiting embodiment, the fleet manager may view the aircraft data being communicated by the fleet of electric aircrafts in the visual form represented by the aircraft data model. Persons skilled in the art, upon reviewing the entirety of this disclosure, will be aware of the use of visual representations of data for purposes as described herein.

With continued reference to FIG. 1, computing device 112 may include a plurality of communication components 120A-D. "Communication components" as used in this disclosure are any devices capable of receiving and transmitting data. In a non-limiting embodiment, the communication components may include a transceiver. For example and without limitation, communication components 120A-D may be configured to transfer transmissions signals describing aircraft data 108A-D to each other. Each communication component may be assigned to an electric aircraft of the electric aircraft. For example, communication component 120A may be assigned to electric aircraft 104A, communication component 120B may be assigned to electric aircraft 104B, communication component 120C may be assigned to electric aircraft 104C, communication component 120D may be assigned to electric aircraft 104D, etc. In a non-limiting embodiment, computing device 112 may include a plurality of communication components for each electric aircraft of the fleet. In a non-limiting embodiment, only some of the electric aircraft of the fleet may be online and/or communicating via network 116, in which only the connected electric aircrafts and their associated communication components may be active in the communication process.

Still referring to FIG. 1, the communication components may include a physical CAN bus unit and/or virtual CAN bus unit. For example and without limitation, each communication component may receive transmission signals comprising of aircraft data 108 from a physical CAN bus unit of the electric aircraft the communication component is receiving from. For instance, if electric aircraft 104A wants to communicate and/or transmit data to electric aircraft 104D, electric aircraft 104 may transmit aircraft data 108A to communication component 120A, which may transfer transmission signals of aircraft data 108A to communication component 120D, wherein communication component 120D may then transmit aircraft data 108A to electric aircraft 104D. In a non-limiting embodiment, communication component 120A comprising a physical CAN bus unit may transmit the transmission signals containing aircraft data 108A to a physical CAN bus unit of communication component 120D. Alternatively or additionally communication component 120A comprising a virtual CAN bus unit may transmit the transmission signals containing aircraft data 108A to a virtual CAN bus unit of communication component 120D.

Still referring to FIG. 1, computing device 112 may use communication components 120A-D to generate various networking systems and/or layers. In a non-limiting embodiment, computing device 112 may include an automated broadcaster configured to determine the location of each electric aircraft connected within network 116. The automated broadcaster may include an Automatic Dependent Surveillance—Broadcast (ADS—B) which includes a surveillance technology in which a simulated vehicle may determine the position of the simulated vehicle of its respected simulation device. In a non-limiting embodiment, computing device 112 may be configured to communicate with an air traffic control (ATC) operator and or pilots of other electric aircrafts for flight plan purpose. For example and without limitation, the data from automated broadcaster can also be received by other aircrafts to provide situational awareness and allow self-separation. In a non-limiting embodiment, ADS—B is "automatic" in that it requires no pilot or external input. It is "dependent" in that it depends on data from the aircraft's navigation system. In a non-limiting embodiment, the automated broadcaster may be configured to be a hub for digital communication with at least a simulated air traffic control operator of the simulated air traffic control.

With continued reference to FIG. 1, system 100 may include a cloud database 128 configured to record any record or data that may be transmitted within network 116. A "cloud database," for the purpose of this disclosure, is a data storage system that runs on a cloud computing platform such as computing device 112. In a non-limiting embodiment, cloud database 128 may store any aircraft data 108 as described herein. In another non-limiting embodiment, cloud database 128 may be used by computing device 112 to retrieve any training data for machine-learning purposes.

Figure 2:
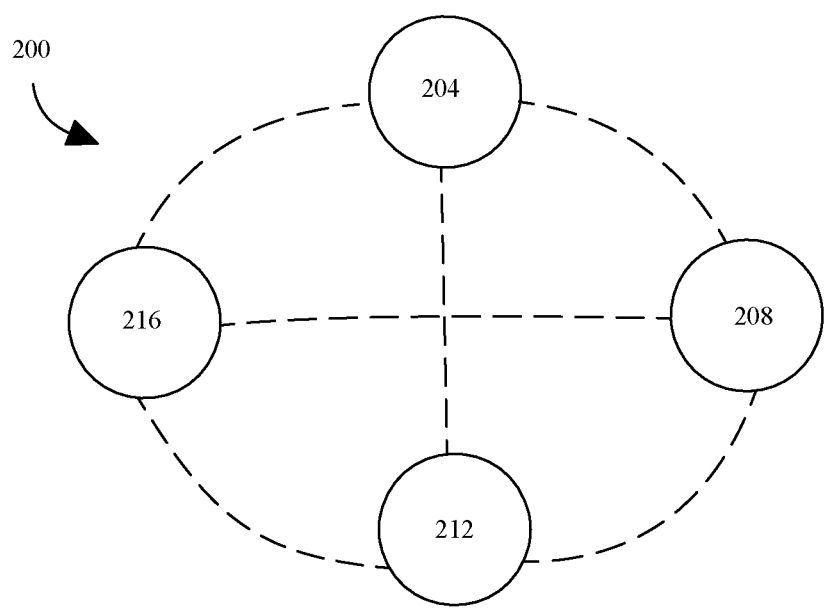
FIG. 2 is a block diagram of an exemplary embodiment of a mesh network for an electric aircraft.

Referring now to FIG. 2, an exemplary embodiment of a system 200 for a mesh network for an electric aircraft is illustrated. In a non-limiting embodiment, the mesh network may be consistent with the mesh network in U.S. patent application Ser. No. 17/478,067 and entitled, "SYSTEM FOR A MESH NETWORK FOR USE IN AIRCRAFTS," which is incorporated by reference herein in its entirety. In a non-limiting embodiment, system 200 may include a node 204. Node 204 may include any computing device as described in this disclosure, including without limitation a microcontroller, microprocessor, digital signal processor (DSP) and/or system on a chip (SoC) as described in this disclosure. Node 204 may include, be included in, and/or communicate with a mobile device such as a mobile telephone or smartphone. Node 204 may include a single computing device operating independently, or may include two or more computing device operating in concert, in parallel, sequentially or the like; two or more computing devices may be included together in a single computing device or in two or more computing devices. Node 204 may interface or communicate with one or more additional devices as described below in further detail via a network interface device. Network interface device may be utilized for connecting node 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Node 204 may include but is not limited to, for example, a computing device or cluster of computing devices in a first location and a second computing device or cluster of computing devices in a second location. Node 204 may include one or more computing devices dedicated to data storage, security, distribution of traffic for load balancing, and the like. Node 204 may distribute one or more computing tasks as described below across a plurality of computing devices of computing device, which may operate in parallel, in series, redundantly, or in any other manner used for distribution of tasks or memory between computing devices. Node 204 may be implemented using a "shared nothing" architecture in which data is cached at the worker, in an embodiment, this may enable scalability of system 200 and/or computing device. In a non-limiting embodiment, node 204 may include and/or represent a communication component as described herein in FIG. 1. Alternatively or additionally, a node may be representative of an electric aircraft of the electric aircraft fleet as described in FIG. 1.

With continued reference to FIG. 2, node 204 may be designed and/or configured to perform any method, method step, or sequence of method steps in any embodiment described in this disclosure, in any order and with any degree of repetition. For instance, node 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Node 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, system 200 may include a plurality of nodes. In some embodiments, system 200 may include and/or communicate with a second node 208. In some embodiments, system 200 may include and/or communicate with a third node 212. In some embodiments, system 200 may include and/or communicate with a fourth node 216. A "node" as used in this disclosure is a computing device that is configured to receive and transmit data to another computing device. A node may include any computing device, such as, but not limited to, an electric aircraft, a laptop, a smartphone, a tablet, a command deck, and/or other computing devices. In some embodiments, node 204 may include a flight controller of an electric aircraft. In some embodiments, node 204, second node 208, third node 212, and fourth node 216 may include a flight controller of an electric aircraft. Alternatively or additionally each node may include a communication component as described in FIG. 1. In some embodiments, node 204 may be configured to transmit and receive data from second node 208, third node 212, and/or fourth node 216. In some embodiments, second node 208 may be configured to transmit and receive data from node 204, third node 212, and/or fourth node 216. In some embodiments, third node 212 may be configured to transmit and receive data from node 204, second node 208, and/or fourth node 216. In some embodiments, fourth node 216 may be configured to transmit and receive data from first node 24, second node 208, and/or third node 212. System 200 may include and/or communicate with a plurality of nodes greater than four nodes. In some embodiments, system 200 may include less than four nodes. A node of system 200 may be configured to communicate data to another node of system 200. Data may include, but is not limited to, aircraft data 108A-D and/or other data. In some embodiments, data may include communication efficiency feedback. "Communication efficiency feedback," as used in this disclosure, is any data concerning effectiveness of data transmission. In some embodiments, communication efficiency feedback may include, but is not limited to, signal strength, signal-noise ratio, error rate, availability of a higher-efficiency mode, physical trajectory of a second node, project change over time, relative strength of a third node, and the like. In some embodiments, system 200 may include and/or communicate with an initial recipient node. An "initial recipient node" as used in this disclosure is any node first transmitted to in a network. In some embodiments, first node 204 may include an initial recipient node. First node 204 may transmit data to second node 208. Second node 208 may transmit communication efficiency feedback to another node of system 200. In some embodiments, communication efficiency feedback may be based on data transmission times between two or more nodes. Communication efficiency feedback may be explicit. Explicit communication efficiency feedback may include second node 208 providing information to first node 204 about transmission times, error rates, signal-noise ratios, and the like. In some embodiments, second node 208 may provide communication efficiency feedback to first node 204 about one or more other nodes in system 200. Communication efficiency feedback about one or more other nodes of system 200 may include, but is not limited to, transmission speed, signal strength, error rate, signal-noise ratio, physical trajectory, availability, projected change over time, and the like. First node 204 may use communication efficiency feedback of second node 204 and/or one or more other nodes of system 200 to select an initial recipient node. Communication efficiency feedback may alternatively or additionally be implicit. Implicit communication efficiency feedback may include first node 204 detecting communication parameters such as, but not limited to, transmission speed, error rate, signal strength, physical trajectory, signal-noise ratio, and the like. First node 204 may determine one or more communication parameters based on a transmission between first node 204 and one or more other nodes of system 200. In some embodiments, first node 204 may store communication parameters of one or more other nodes. In a non-limiting example, first node 204 may store communication parameters of second node 204 which may include that second node 204 may have a high signal-noise ratio. First node 204 may search for another node of system 200 to select as an initial recipient node based on stored communication parameters of second node 208. In some embodiments, first node 204 may compare one or more communication parameters of a communication efficiency feedback of one or more nodes to select an initial recipient node. First node 204 may compare a communication efficiency feedback to a communication threshold. A "communication threshold" as used in this disclosure is any minimum or maximum value of a communication metric. A communication threshold may include, but is not limited to, an error rate, a transmission speed, a signal-noise ratio, a physical trajectory, a signal strength, and the like. In some embodiments, first node 204 may receive data from second node 208 about a third node, fourth node, etc. Data about a third node, fourth node, etc. may include communication efficiency feedback. First node 204 may use data received from second node 208 about another node to select from a plurality of nodes of system 200. First node 204 may utilize a machine-learning model to predict an optimal communication pathway of nodes. A machine-learning model may be trained on training data correlating communication parameters to selected initial recipient nodes. Training data may be obtained from prior transmissions, stored data of one or more nodes, and/or received from an external computing device. In some embodiments, training data may be obtained from a user input. First node 204 may utilize a machine-learning model to compare one or more nodes based on one or more communication parameters for an optimal pathway selection.

Still referring to FIG. 2, first node 204 may generate an objective function to compare communication parameters of two or more nodes. An "objective function" as used in this disclosure is a process of maximizing or minimizing one or more values based on a set of constraints. In some embodiments, an objective function of generated by first node 204 may include an optimization criterion. An optimization criterion may include any description of a desired value or of values for one or more attributes of a communication pathway; desired value or range of values may include a maximal or minimal value, a range between maximal or minimal values, or an instruction to maximize or minimize an attribute. As a non-limiting example, an optimization criterion of at least an optimization criterion may specify that a communication should have a fast transmission time; an optimization criterion may cap error rates of a transmission. An optimization criterion may specify one or more thresholds for communication parameters in transmission pathways. An optimization criterion may specify one or more desired physical trajectories for a communication pathway. In an embodiment, at least an optimization criterion may assign weights to different attributes or values associated with attributes; weights, as used herein, may be multipliers or other scalar numbers reflecting a relative importance of a particular attribute or value. As a non-limiting example, minimization of response time may be multiplied by a first weight, while a communication threshold above a certain value may be multiplied by a second weight. Optimization criteria may be combined in weighted or unweighted combinations into a function reflecting an overall outcome desired by a user; function may be a communication function to be minimized and/or maximized. Function may be defined by reference to communication constraints and/or weighted aggregation thereof; for instance, a communication function combining optimization criteria may seek to minimize or maximize a function of communication constraints.

Still referring to FIG. 2, first node 204 may use an objective function to compare second node 204 to one or more other nodes. Generation of an objective function may include generation of a function to score and weight factors to achieve a communication score for each feasible pairing. In some embodiments, pairings may be scored in a matrix for optimization, where columns represent nodes and rows represent communications potentially paired therewith; each cell of such a matrix may represent a score of a pairing of the corresponding node to the corresponding communication. In some embodiments, assigning a predicted process that optimizes the objective function includes performing a greedy algorithm process. A "greedy algorithm" is defined as an algorithm that selects locally optimal choices, which may or may not generate a globally optimal solution. For instance, first node 204 may select pairings so that scores associated therewith are the best score for each order and/or for each process. In such an example, optimization may determine the combination of processes such that each object pairing includes the highest score possible.

Still referring to FIG. 2, an objective function may be formulated as a linear objective function. First node 204 may solve objective function 244 using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all nodes r, S is a set of all communications s, $c_{rs}$ is a score of a pairing of a given node with a given communication, and $x_{rs}$ is 2 if a node r is paired with a communication s, and 0 otherwise. Continuing the example, constraints may specify that each node is assigned to only one communication, and each communication is assigned only one node. Communications may include communications and/or transmissions as described above. Sets of communications may be optimized for a maximum score combination of all generated communications. In various embodiments, first node 204 may determine a combination of nodes that maximizes a total score subject to a constraint that all nodes are paired to exactly one communication. In some embodiments, not all communications may receive a node pairing since each communication may only use one node. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on first node 204 and/or another device in system 200, and/or may be implemented on third-party solver.

With continued reference to FIG. 2, optimizing an objective function may include minimizing a loss function, where a "loss function" is an expression an output of which an optimization algorithm minimizes to generate an optimal result. As a non-limiting example, first node 204 may assign variables relating to a set of parameters, which may correspond to a score of communications as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of response times. Objectives may include minimization of error rate of transmission. Objectives may include minimization of nodes used. Objectives may include minimization of signal-noise ratio. Objectives may include minimization of physical trajectory.

Still referring to FIG. 2, first node 204 may use a fuzzy inferential system to determine an initial recipient node. "Fuzzy inference" is the process of formulating a mapping from a given input to an output using fuzzy logic. "Fuzzy logic" is a form of many-valued logic in which the truth value of variables may be any real number between 0 and 2. Fuzzy logic may be employed to handle the concept of partial truth, where the truth value may range between completely true and completely false. The mapping of a given input to an output using fuzzy logic may provide a basis from which decisions may be made and/or patterns discerned. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within the first fuzzy set. A first membership function may include any suitable function mapping a first range to a probability interval, including without limitation a triangular function defined by two linear elements such as line segments or planes that intersect at or below the top of the probability interval.

Still referring to FIG. 2, a first fuzzy set may represent any value or combination of values as described above, including communication parameters. A second fuzzy set, which may represent any value which may be represented by first fuzzy set, may be defined by a second membership function on a second range; second range may be identical and/or overlap with first range and/or may be combined with first range via Cartesian product or the like to generate a mapping permitting evaluation overlap of first fuzzy set and second fuzzy set. Where first fuzzy set and second fuzzy set have a region that overlaps, first membership function and second membership function may intersect at a point representing a probability, as defined on probability interval, of a match between first fuzzy set and second fuzzy set. Alternatively or additionally, a single value of first and/or second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process. In some embodiments, there may be multiple thresholds. Each threshold may be established by one or more user inputs. Alternatively or additionally, each threshold may be tuned by a machine-learning and/or statistical process, for instance and without limitation as described in further detail below.

Still referring to FIG. 2, first node 204 may use a fuzzy inference system to determine a plurality of outputs based on a plurality of inputs. A plurality of outputs may include a communication efficiency of one or more nodes. A plurality of inputs may include communication efficiency feedback as described above. In a non-limiting example, first node 204 may detect that second node 208 may have slow response time and a far physical trajectory. First node 204 may determine, using fuzzy logic, that second node 208 is "too far" for selection as an initial recipient node. In another non-limiting example, first node 204 may detect that second node 208 may have a high transmission speed and a close physical trajectory. First node 204 may determine that second node 208 has a "strong signal".

Still referring to FIG. 2, first node 204 may determine a connectivity of a plurality of potential initial recipient nodes. First node 204 may determine, using any process described in this disclosure, an optimal initial recipient node according to a selection criteria. A selection criteria may include, but is not limited to, physical trajectory, projected change over time, signal strength, error rate, transmission speeds, response times, neighboring nodes, and the like. In some embodiments, each node of system 200 may iteratively ID initial recipient nodes and calculate a best option score and an average score. Each node may send a best option score and/or an average score to all nodes of system 200. A node of system 200 may calculi and update a best option score and/or an average score based on data received from other nodes of system 200. In some embodiments, by having each node update a best option score and average score of their own initial recipient nodes, first node 204 may select an initial recipient node based on robustness and speed of each possible pathway of other nodes of system 200.

In some embodiments, and continuing to refer to FIG. 2, node 204 may be generated from a flight controller of an aircraft and/or communication component as described above. In some embodiments, system 200 may include, participate in, and/or be incorporated in a network topology. A "network topology" as used in this disclosure is an arrangement of elements of a communication network. In some embodiments, system 200 may include, but is not limited to, a star network, tree network, and/or a mesh network. A "mesh network" as used in this disclosure is a local network topology in which the infrastructure nodes connect directly, dynamically, and non-hierarchically to as many other nodes as possible. Nodes of system 200 may be configured to communicate in a partial mesh network. A partial mesh network may include a communication system in which some nodes may be connected directly to one another while other nodes may need to connect to at least another node to reach a third node. In some embodiments, system 200 may be configured to communicate in a full mesh network. A full mesh network may include a communication system in which every node in the network may communicate directly to one another. In some embodiments, system 200 may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no cross-talk between the two layers which advantageously provides a redundancy and safeguard in the event of a disruption in the operation of one of the layers. A layer may be an abstraction which is not tangible.

Still referring to FIG. 2, in some embodiments, system 200 may include node 204, second node 208, third node 212, and/or fourth node 216. Node 204 may be configured to communicate with a first layer providing radio communication between nodes at a first bandwidth. In some embodiments, node 204 may be configured to communicate with a second layer providing mobile network communication between the nodes at a second bandwidth. In some embodiments, node 204 may be configured to communicate with a third layer providing satellite communication between the nodes at a third bandwidth. In some embodiments, any node of system 200 may be configured to communicate with any layer of communication. In some embodiments, a node of system 200 may include an antenna configured to provide radio communication between one or more nodes. For example, and without limitation, an antenna may include a directional antenna. In an embodiment, system 200 may include a first bandwidth, a second bandwidth, and a third bandwidth. In some embodiments, system 200 may include more or less than three bandwidths. In some embodiments, a first bandwidth may be greater than a second bandwidth and a third bandwidth. In some embodiments, system 200 may be configured to provide mobile network communication in the form a cellular network, such as, but not limited to, 2G, 3G, 4G, 5G, LTE, and/or other cellular network standards.

Still referring to FIG. 2, radio communication, in accordance with embodiments, may utilize at least a communication band and communication protocols suitable for aircraft radio communication. For example, and without limitation, a very-high-frequency (VHF) air band with frequencies between about 208 MHz and about 237 MHz may be utilized for radio communication. In another example, and without limitation, frequencies in the Gigahertz range may be utilized. Airband or aircraft band is the name for a group of frequencies in the VHF radio spectrum allocated to radio communication in civil aviation, sometimes also referred to as VHF, or phonetically as "Victor". Different sections of the band are used for radio-navigational aids and air traffic control. Radio communication protocols for aircraft are typically governed by the regulations of the Federal Aviation Authority (FAA) in the United States and by other regulatory authorities internationally. Radio communication protocols may employ, for example and without limitation an S band with frequencies in the range from about 2 GHz to about 4 GHz. For example, and without limitation, for 4G mobile network communication frequency bands in the range of about 2 GHz to about 8 GHz may be utilized, and for 5G mobile network communication frequency bands in the ranges of about 450 MHz to about 6 GHz and of about 24 GHz to about 53 GHz may be utilized. Mobile network communication may utilize, for example and without limitation, a mobile network protocol that allows users to move from one network to another with the same IP address. In some embodiments, a node of system 200 may be configured to transmit and/or receive a radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. A radio frequency (RF) transmission signal may compose an analogue and/or digital signal received and be transmitted using functionality of output power of radio frequency from a transmitter to an antenna, and/or any RF receiver. A RF transmission signal may use longwave transmitter device for transmission of signals. An RF transmission signal may include a variety of frequency ranges, wavelength ranges, ITU designations, and IEEE bands including HF, VHF, UHF, L, S, C, X, Ku, K, Ka, V, W, mm, among others.

Still referring to FIG. 2, satellite communication, in accordance with embodiments, may utilize at least a communication band and communication protocols suitable for aircraft satellite communication. For example, and without limitation, satellite communication bands may include L-band (1-2 GHz), C-band (4-8 GHz), X-band (8-12 GHz), Ku-band (12-18 GHz), Ku-band (12-18 GHz), and the like, among others. Satellite communication protocols may employ, for example and without limitation, a Secondary Surveillance Radar (SSR) system, automated dependent surveillance-broadcast (ADS-B) system, or the like. In SSR, radar stations may use radar to interrogate transponders attached to or contained in aircraft and receive information in response describing such information as aircraft identity, codes describing flight plans, codes describing destination, and the like SSR may utilize any suitable interrogation mode, including Mode S interrogation for generalized information. ADS-B may implement two communication protocols, ADS-B-Out and ADS-B-In. ADS-B-Out may transmit aircraft position and ADS-B-In may receive aircraft position. Radio communication equipment may include any equipment suitable to carry on communication via electromagnetic waves at a particular bandwidth or bandwidth range, for example and without limitation, a receiver, a transmitter, a transceiver, an antenna, an aerial, and the like, among others. A mobile or cellular network communication equipment may include any equipment suitable to carry on communication via electromagnetic waves at a particular bandwidth or bandwidth range, for example and without limitation, a cellular phone, a smart phone, a personal digital assistant (PDA), a tablet, an antenna, an aerial, and the like, among others. A satellite communication equipment may include any equipment suitable to carry on communication via electromagnetic waves at a particular bandwidth or bandwidth range, for example and without limitation, a satellite data unit, an amplifier, an antenna, an aerial, and the like, among others.

Still referring to FIG. 2, as used in this disclosure "bandwidth" is measured as the amount of data that can be transferred from one point or location to another in a specific amount of time. The points or locations may be within a given network. Typically, bandwidth is expressed as a bitrate and measured in bits per second (bps). In some instances, bandwidth may also indicate a range within a band of wavelengths, frequencies, or energies, for example and without limitation, a range of radio frequencies which is utilized for a particular communication.

Still referring to FIG. 2, as used in this disclosure "antenna" is a rod, wire, aerial or other device used to transmit or receive signals such as, without limitation, radio signals and the like. A "directional antenna" or beam antenna is an antenna which radiates or receives greater power in specific directions allowing increased performance and reduced interference from unwanted sources. Typical examples of directional antennas include the Yagi antenna, the log-periodic antenna, and the corner reflector antenna. The directional antenna may include a high-gain antenna (HGA) which is a directional antenna with a focused, narrow radio wave beamwidth and a low-gain antenna (LGA) which is an omnidirectional antenna with a broad radio wave beamwidth, as needed or desired.

With continued reference to FIG. 2, as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 228 [printer port]), and the like.

Still referring to FIG. 2, in some cases, a node of system 200 may perform one or more signal processing steps on a sensed characteristic. For instance, a node may analyze, modify, and/or synthesize a signal representative of characteristic in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
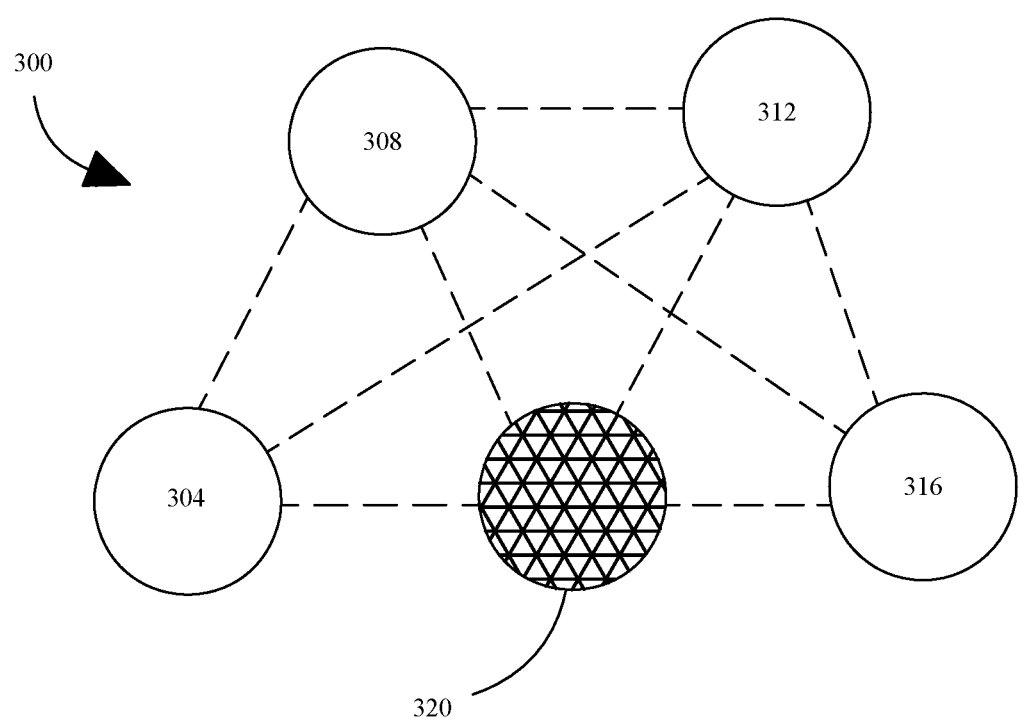
FIG. 3 is another block diagram of an exemplary embodiment of a mesh network for an aircraft.

Now referring to FIG. 3, a system 300 for a network is illustrated. In some embodiments, system 300 may include nodes 304, 308, 312, and 316. A network of nodes of system 300 may be configured as described above with respect to FIG. 1. System 300 shows inactive node 320. Inactive node 320 may include a physically damaged node generating component, data corrupted node, and/or powered down node. In a non-limiting example, node 304 may be configured to transmit data to inactive node 320. Inactive node 320 may be configured to relay data from node 304 to node 316. Node 304 may be configured to communicate with another node to relay data to node 316 in the case that inactive node 320 may not be functioning. In some embodiments, node 304 may be configured to relay data to node 308. Node 308 may be configured to relay data from node 304 to node 316. In some embodiments, node 304 may be configured to transmit data to node 312. Node 312 may be configured to relay data from node 304 to node 316. Any node of system 300 may be configured to relay data from one node to another through an alternate pathway in an event a node may be inactive. In some embodiments, nodes of system 300 may be configured to choose a data transmission pathway from one node to another node. A "data transmission pathway" as used in this disclosure is a selection of communication from one node to one or more other nodes. In some embodiments, a data transmission pathway may be calculated based on, but not limited to, signal strength, node distance, number of nodes, node traffic, inactive nodes, active nodes, and the like. In a non-limiting example, node 304 may transmit data to node 316 through node 312. Node 312 may have a slow response time communicating data to node 304. Node 304 may detect a slow response time of node 312 and update a pathway of transmission by communicating data to node 308 which may relay data to node 316. In some embodiments, system 300 may utilize a machine learning model to predict optimal data transmission pathways of nodes. A machine learning model may input a plurality of node connections and output an optimal data transmission pathway between nodes. In some embodiments, a machine learning model may be trained on training data correlating node connections to an optimal data transmission pathway. System 300 may utilize a machine learning model to update connections between nodes that may assist in transmission speed, data security, and the like.

Figure 4:
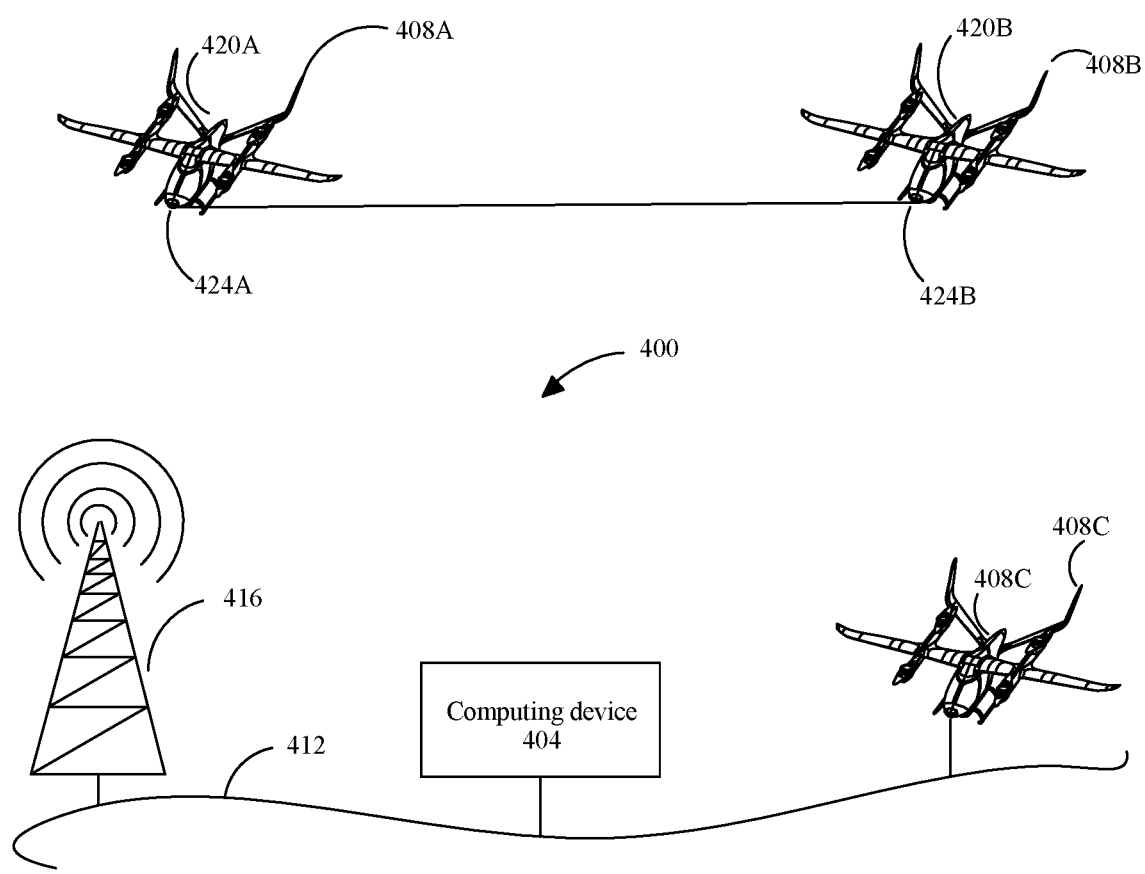
FIG. 4 is an illustration of an exemplary embodiment of an avionic mesh network.

Referring to FIG. 4, an avionic mesh network 400 is schematically illustrated. According to some embodiments, an avionic mesh network may include a single network. Alternatively or additionally, an avionic mesh network may include more than a single network. A single networks may be differentiated according to address, for example Internet Protocol address, gateway, or name server used. For example, in some cases, multiple networks may use different gateways, even though the multiple networks may still be within communicative connection with one another.

With continued reference to FIG. 4, in some embodiments, an avionic mesh network 400 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component communicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and communicatively connected. As used in this disclosure, a "non-aircraft network node" is a network node that is not located on an aircraft and is communicatively connected to a network.

With continued reference to FIG. 4, in some embodiments, avionic mesh network 400 may include a wireless mesh network organized in a mesh topology. A mesh topology may include a networked infrastructure in which network nodes may be connected directly, dynamically, and/or non-hierarchically to many other nodes (e.g., as many other nodes as possible). In some cases, a mesh topology may facilitate cooperation between network nodes, for example redistributive network nodes, in routing of communication between network participants (e.g., other network nodes). A mesh topology may facilitate a lack of dependency on any given node, thereby allowing other nodes to participate in relaying communication. In some cases, mesh networks may dynamically self-organize and self-configure. Self-configuration enables dynamic distribution of workloads, particularly in event a network node failure, thereby contributing to fault-tolerance and reduced maintenance requirements. In some embodiments, mesh networks can relay messages using either a flooding technique or a routing technique. A flooding technique sends a message to every network node, flooding network with the message. A routing technique allows a mesh network to communicate a message is propagated along a determined nodal path to the message's intended destination. Message routing may be performed by mesh networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a mesh network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 4, an exemplary avionic mesh network 400 is shown providing communicative connection between a computing device 404 and aircraft 408A-C. Computing device 404 may include any computing device described in this disclosure. In some embodiments, computing device 404 may be connected to a terrestrial network 412. Terrestrial networks 412 may include any network described in this disclosure and may include, without limitation, wireless networks, local area networks (LANs), wide area networks (WANs), ethernet, Internet, mobile broadband, fiber optic communication, and the like. In some cases, a grounded aircraft 408C may be connected to an avionic mesh network 400 by way of a terrestrial network 412. In some cases, avionic mesh network 400 may include a wireless communication node 416. A wireless communication node 416 may provide communicative connection by way of wireless networking. Wireless networking may include any wireless network method described in this disclosure, including without limitation Wi-Fi, mobile broadband, optical communication, radio communication, and the like. In some cases, wireless communication node 416 may be configured to connect with a first airborne aircraft in flight 408A. First airborne aircraft in some embodiments may include at least a first intra-aircraft network node 420A. As described above, first intra-aircraft network node 420A may be configured to connect to other nodes within first airborne aircraft 408A. In some cases, avionic mesh network 400 may be configured to provide inter-aircraft communication, for instance by using a first inter-aircraft network node 424A. In some cases, first inter-aircraft network node may be configured to communicate with a second inter-aircraft network node 424B. Inter-aircraft nodes 420A-B may include radio communication and/or optical wireless communication, for example free space optical communication.

With continued reference to FIG. 4, avionic mesh network 400 may be additionally configured to provide for encrypted and/or secured communication between components, i.e., nodes, communicative on the network. In some cases, encrypted communication on network 400 may be provided for by way of end-to-end encryption. Exemplary non-limited end-to-end encryption methods include symmetric key encryption, asymmetric key encryption, public key encryption methods, private key encryption methods and the like. In some cases, avionic mesh network 400 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic mesh network 400 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum system disturbs the quantum system. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Still referring to FIG. 4, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 4, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 4, in some cases, avionic mesh network 400 may be configured to allow message authentication between network nodes. In some cases, message authentication may include a property that a message has not been modified while in transit and that receiving party can verify source of the message. In some embodiments, message authentication may include us of message authentication codes (MACs), authenticated encryption (AE), and/or digital signature. Message authentication code, also known as digital authenticator, may be used as an integrity check based on a secret key shared by two parties to authenticate information transmitted between them. In some cases, a digital authenticator may use a cryptographic hash and/or an encryption algorithm.

Still referring to FIG. 4, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 4, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 4, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 4, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Still referring to FIG. 4, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 4, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 4, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 4, as described above in some embodiments an avionic mesh network 400 may provide secure and/or encrypted communication at least in part by employing digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 4, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 4, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 5:
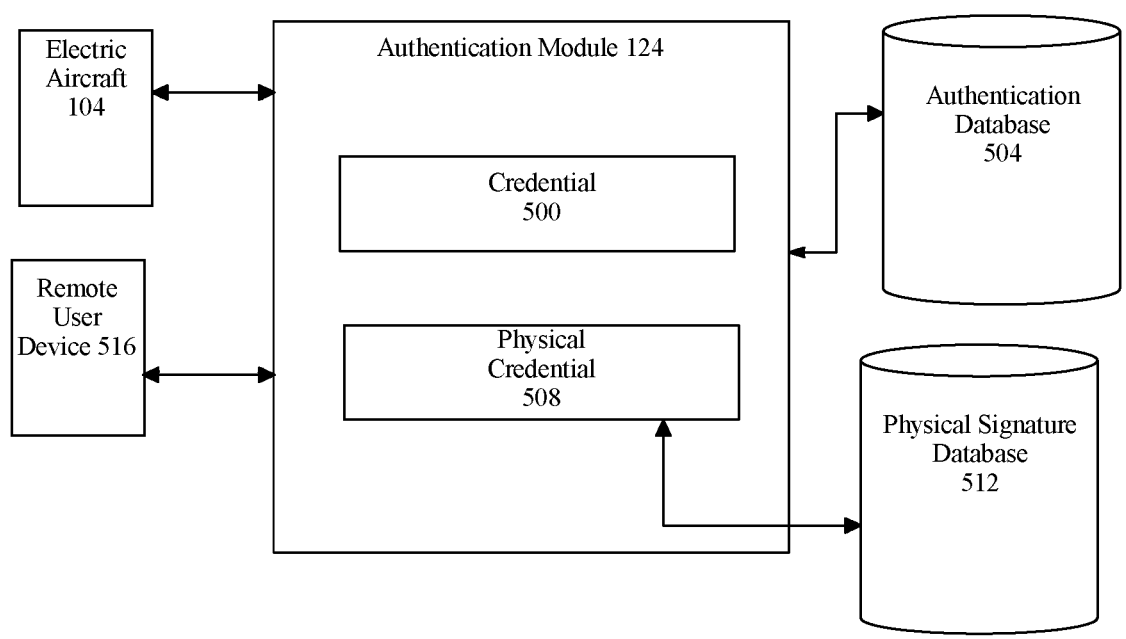
FIG. 5 is a block diagram of an exemplary embodiment of an authentication module.

Referring now to FIG. 5, an embodiment of authentication module 124, as pictured in FIG. 1, is illustrated in detail. Authentication module 124 may include any suitable hardware and/or software module. Authentication module 124 and/or computing device 112 can be configured to authenticate electric aircrafts 104A-D and or any electric aircrafts 104A-D of the electric aircraft fleet. Authenticating, for example and without limitation, can include determining an electric vehicle's ability/authorization to access information included in each module and/or engine of the plurality of modules and/or engines operating on computing device 112. As a further example and without limitation, authentication may include determining an instructor's authorization/ability of access to the information included in each module and/or engine of the plurality of modules and/or engines operating on computing device 112. As a further non-limiting example, authentication may include determining an administrator's authorization/ability to access the information included in each module and/or engine of the plurality of modules and/or engines operating on computing device 112. Authentication may enable access to an individual module and/or engine, a combination of modules and/or engines, and/or all the modules and/or engines operating on computing device 112. In a non-limiting embodiment, authentication module 124 may be configured to receive credential 500 from electric aircrafts 104A-DA-D. Credential 500 may include any credential as described above in further detail in reference to FIG. 1. For example and without limitation, credential 500 may include a username and password unique to the user and/or electric aircrafts 104A-D. As a further example and without limitation, credential 500 may include a PKI certificate unique to the user and/or electric aircrafts 104A-D. As a further embodiment, credential 500 may be received from remote user device 516 and/or admin device 520, such that credential 500 would authenticate an admin device 520, respectively. An "remote user device," for the purpose of this disclosure, may be a user device used by a fleet manager for managing, monitoring, and/or facilitating communication of the fleet of electric aircraft as described in FIG. 1. In a non-limiting embodiment, a fleet manager may communicate with each electric aircraft of the fleet of electric aircrafts 104A-D via remote user device 516. For example and without limitation, the operator may monitor the plurality of electric aircrafts in the sky that are in range and/or connected to the network, authenticate any incoming electric aircraft of the fleet, and facilitate communication between the plurality of electric aircrafts which may include transferring a plurality of aircraft data using any means as described herein.

Continuing to refer to FIG. 5, authentication module 124 and/or computing device 112 may be further designed and configured to compare credential 500 from electric aircrafts 104A-D to an authorized credential stored in authentication database 504. For example, authentication module 124 and/or computing device 112 may be configured to compare credential 500 from electric aircrafts 104A-D to a stored authorized credential to determine if credential 500 matches the stored authorized credential. As a further embodiment, authentication module 124 and/or computing device may compare credential 500 from remote user device 516 to an authorized credential stored in authentication database 504. For example, authentication module 124 and/or computing device may be configured to compare credential 500 from remote user device 516 to a stored authorized credential to determine if credential 500 matches the stored authorized credential. As a further non-limiting example, authentication module 124 and/or computing device 112 may match credential 500 from admin device 520 to an authorized credential stored in authentication database 504. For example, authentication module 124 and/or computing device may be configured to compare credential 500 from admin device 520 to a stored authorized credential to determine if credential 500 matches the stored authorized credential. In embodiments, comparing credential 500 to an authorized credential stored in authentication database 504 can include identifying an authorized credential stored in authentication database 504 by matching credential 500 to at least one authorized credential stored in authentication database 504. Authentication module 124 and/or computing device 112 may include or communicate with authentication database 504. Authentication database 504 may be implemented as any database and/or datastore suitable for use as authentication database 504 as described in the entirety of this disclosure. The "authorized credential" as described in the entirety of this disclosure, is the unique identifier that will successfully authorize each pilot and/or electric aircrafts 104A-DA-D if received. For example and without limitation, the authorized credential is the correct alpha-numeric spelling, letter case, and special characters of the username and password for electric aircrafts 104A-D. Persons skilled in the art, upon reviewing the entirety of this disclosure, will be aware of various examples of authorized credentials that may be stored in the authentication database consistently with this disclosure.

Still referring to FIG. 5, authentication module 124 and/or computing device 112 is further designed and configured to bypass authentication for electric aircrafts 104A-D based on the identification of the authorized credential stored within authentication database 504. Bypassing authentication may include permitting access to electric aircrafts 104A-D to access the information included in each module and/or engine of the plurality of modules and/or engines operating on computing device 112. Bypassing authentication may enable access to an individual module and/or engine, a combination of modules and/or engines, and/or all the modules and/or engines operating on computing device 112, as described in further detail in the entirety of this disclosure. As a further example and without limitation, bypassing authentication may include bypassing authentication for remote user device 516 based on the comparison of the authorized credential stored in authentication database 504. As a further non-limiting example, bypassing authentication may include bypassing authentication for admin device 520 based on the comparison of the authorized credential stored in authentication database 112.

With continued reference to FIG. 5, authentication module 124 and/or computing device 112 may be further configured to authenticate electric aircrafts 104A-D as a function of a physical signature authentication. A "physical signature authentication," for the purpose of this disclosure, is an authentication process that determines an electric vehicle's ability to access the information included in each module and/or engine of the plurality of modules and/or engines operating on computing device 112 as a function of a physical signature credential 508. In a non-limiting embodiment, physical signature authentication, in the embodiment, includes receiving physical signature credential 508 from electric aircrafts 104A-D, comparing and/or matching physical signature credential 508 from electric aircrafts 104A-D to an authorized physical signature credential stored in a physical signature database 512, and bypassing authentication for electric aircrafts 104A-D based on the comparison of the authorized physical signature credential stored within physical signature database 512. Physical signature authentication employing authentication module 124 may also include authenticating remote user device 516 and/or admin device 520. Authentication module 124 and/or computing device 112 may include or communicate with physical signature database 512. Physical signature database 512 may be implemented as any database and/or datastore suitable for use as a physical signature database entirely with this disclosure. An exemplary embodiment of physical signature database 512 is provided below in reference to FIG. 5. The "physical signature credential" as used in this disclosure, is any physical identifier, measurement, and/or calculation utilized for identification purposes regarding an electric vehicle and/or its pilot. In a non-limiting embodiment, physical signature credential 508 may include, but not limited to, a physiological characteristic and/or behavioral characteristic of the pilot associated with the electric vehicle. For example and without limitation, physical signature credential 508 may include vehicle model number, vehicle model type, vehicle battery type, vehicle authority level, pilot authority level, and the like thereof. The "authorized physical signature credential" as described in the entirety of this disclosure, is unique physical signature identifier that will successfully authorize each user and/or electric aircrafts 104A-D, such that the authorized physical signature credential is the correct physical signature credential which will enable the user and/or electric aircrafts 104A-D access to the plurality of modules and/or engines operating on computing device 112. Persons skilled in the art, upon reviewing the entirety of this disclosure, will be aware of various examples of physical signature credentials and authorized physical signature credentials that may be utilized by authentication module 124 consistently with this disclosure.

Figure 6:
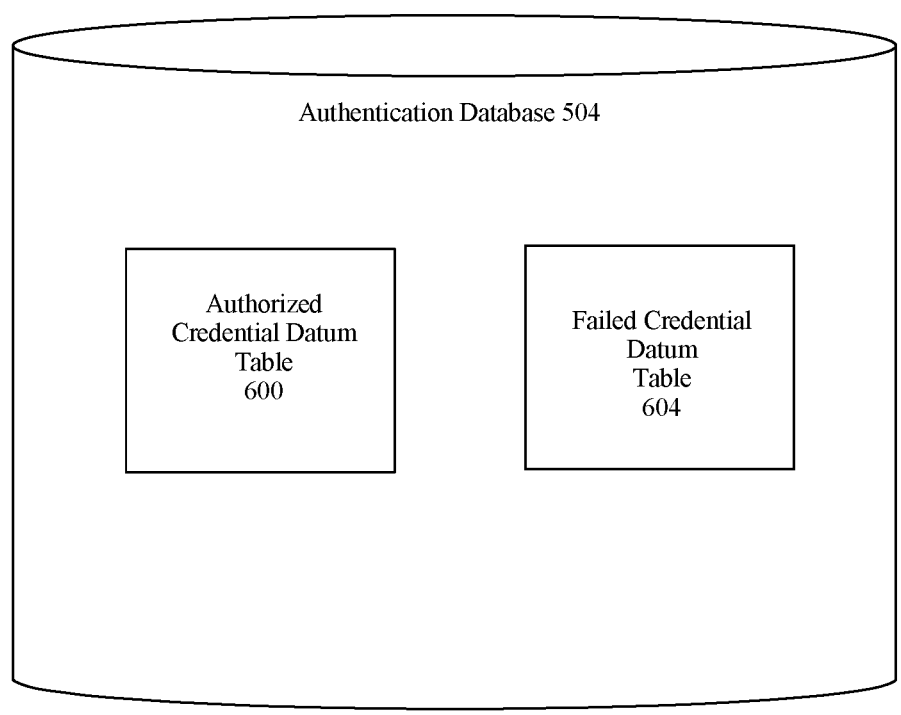
FIG. 6 is a block diagram illustrating an exemplary embodiment of an authentication database.

Referring now to FIG. 6, an embodiment of authentication database 504 is illustrated. Authentication database 504 may include any data structure for ordered storage and retrieval of data, which may be implemented as a hardware or software module. Authentication database 504 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 504 may include a plurality of data entries and/or records corresponding to credentials as described above. Data entries and/or records may describe, without limitation, data concerning authorized credential datum and failed credential datum.

With continued reference to FIG. 6, one or more database tables in authentication database 504 may include as a non-limiting example an authorized credential datum table 600. Authorized credential datum table 600 may be a table storing authorized credentials, wherein the authorized credentials may be for electric aircrafts 104A-D, remote user device, as described in further detail in the entirety of this disclosure. For instance, and without limitation, authentication database 504 may include an authorized credential datum table 600 listing unique identifiers stored for electric aircrafts 104A-D, wherein the authorized credential is compared/matched to a credential 500 received from electric aircrafts 104A-D.

Still referring to FIG. 6, one or more database tables in authentication database 504 may include, as a non-limiting example, failed credential datum table 604. A "failed credential", as described in the entirety of this disclosure, is a credential received from a device that did not match an authorized credential stored within authorized credential datum table 600 of authentication database 504. Such credentials can be received from electric aircrafts 104A-D, remote user device 516. Failed credential datum table 604 may be a table storing and/or matching failed credentials. For instance and without limitation, authentication database 504 may include failed credential datum table 604 listing incorrect unique identifiers received by a device in authentication module 168, wherein authentication of the device did not result. Tables presented above are presented for exemplary purposes only; persons skilled in the art will be aware of various ways in which data may be organized in authentication database 504 consistently with this disclosure.

Figure 7:
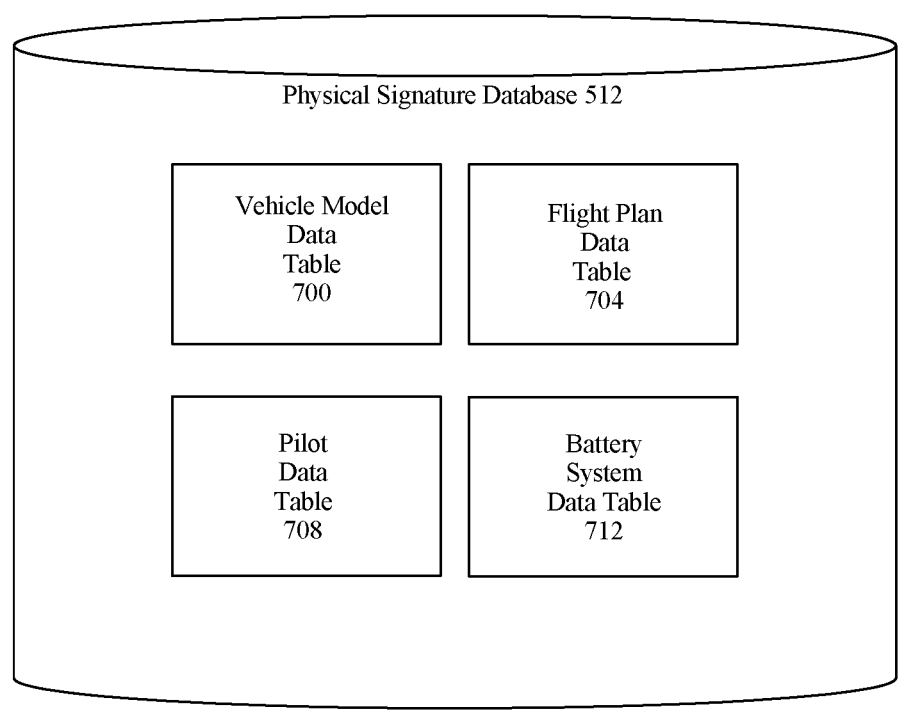
FIG. 7 is a block diagram illustrating an exemplary embodiment of a physical signature database.

Referring now to FIG. 7, an embodiment of physical signature database 512 is illustrated. Physical signature database 512 may include any data structure for ordered storage and retrieval of data, which may be implemented as a hardware or software module. Physical signature database 512 may be implemented, without limitation, as a relational database, a key-value retrieval datastore such as a NOSQL database, or any other format or structure for use as a datastore that a person skilled in the art would recognize as suitable upon review of the entirety of this disclosure. Physical signature database 512 may include a plurality of data entries and/or records corresponding to elements of physical signature datum as described above. Data entries and/or records may describe, without limitation, data concerning particular physiological characteristics and/or behavioral characteristics that have been collected. Data entries in a physical signature database 512 may be flagged with or linked to one or more additional elements of information, which may be reflected in data entry cells and/or in linked tables such as tables related by one or more indices in a relational database; one or more additional elements of information may include data associating a physical signature with one or more cohorts, including demographic groupings such as ethnicity, sex, age, income, geographical region, or the like. Additional elements of information may include one or more categories of physical signature datum as described above. Persons skilled in the art, upon reviewing the entirety of this disclosure, will be aware of various ways in which data entries in a physical signature database 512 may reflect categories, cohorts, and/or populations of data consistently with this disclosure.

Still referring to FIG. 7, one or more database tables in physical signature database 512 may include, as a non-limiting example, vehicle model data table 700. Vehicle model data table 700 may be a table correlating, relating, and/or matching physical signature credentials received from a device, such as electric aircrafts 104A-D and/or remote user device 516 as described above, to fingerprint data. For instance, and without limitation, physical signature database 512 may include a vehicle model data table 700 listing samples acquired from an electric vehicle having allowed system 100 to retrieve data describing the make and model of the electric vehicle. The data may be retrieved by any identifier scanner that is configured to scan the shape, size, and/or any digital signature incorporated onto the electric vehicle. In a non-limiting embodiment, the electric vehicle itself may transmit the model data itself. Such data may be inserted in vehicle model data table 700.

With continued reference to FIG. 7, physical signature database 512 may include tables listing one or more samples according to a sample source. As another non-limiting example, physical signature database 512 may include flight plan data table 704, which may list samples acquired from an electric vehicle associated with electric aircrafts 104A-D that has allowed system 100 to obtain information such as a flight plan of the electric vehicle, destination, cruising speed, and/or the like. For instance, and without limitation, physical signature database 512 may include pilot data table 708 listing samples acquired from an electric vehicle by obtaining the information regarding the pilot such as, pilot experience level, pilot authority level, pilot seniority level, and the like thereof. As a further non-limiting example, physical signature database 512 may include a battery system data table 712, which may list samples acquired from an electric vehicle associated with electric aircrafts 104A-D that has allowed system 100 to retrieve the battery pack datum of electric aircrafts 104A-D and/or the like. Tables presented above are presented for exemplary purposes only; persons skilled in the art will be aware of various ways in which data may be organized in physical signature database 512 consistently with this disclosure.

Figure 8:
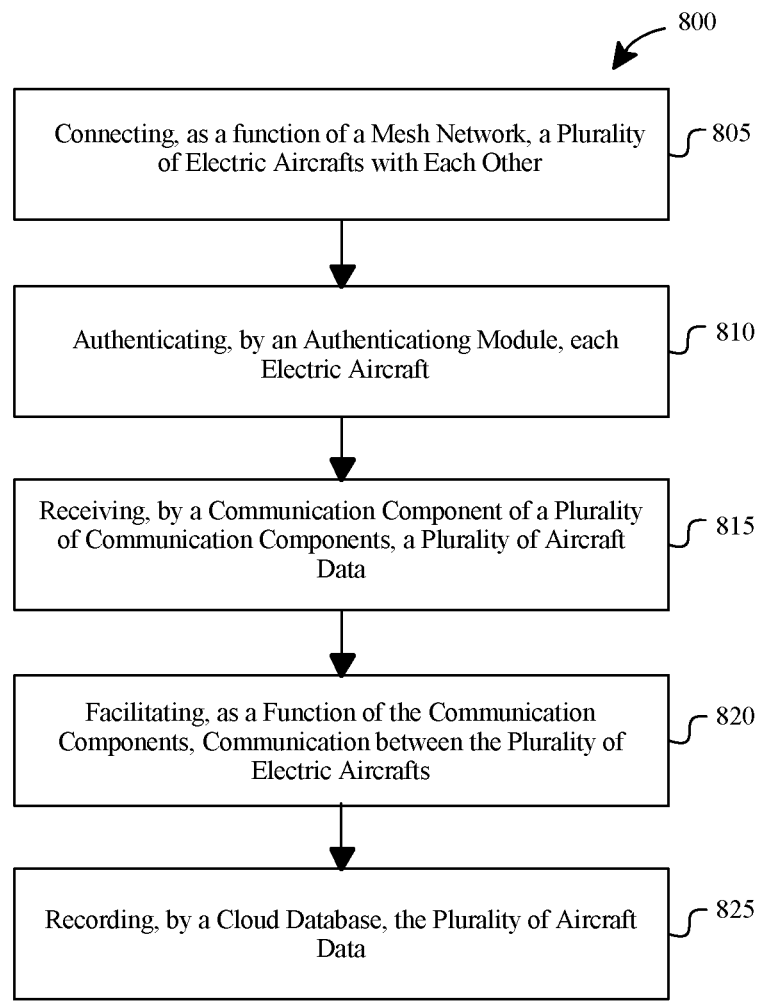
FIG. 8 is a flow diagram of an exemplary embodiment of a method for swarm communication for an electric aircraft fleet.

Referring now to FIG. 8, a flow diagram of an exemplary embodiment of a method 800 for swarm communication for an electric aircraft fleet is provided. Method 800, at step 805, may include connecting, as a function of a mesh network, a plurality of electric aircrafts with each other. The mesh network may include any meshwork as described herein. In a non-limiting embodiment, the mesh network may include an avionic mesh network. The mesh network may utilize any network topology as described herein. In a non-limiting embodiment, the mesh network may include a plurality of local mesh networks and a central mesh network. The local mesh network may include any local mesh network as described herein. In some embodiments, each local network comprises a plurality of nodes representing non-local entities. The central mesh network may include any central mesh network as described herein. In a non-limiting embodiment, method 800 may include communicating, via the central mesh network, with the plurality of nodes representing non-local entities as a function of the plurality of local mesh networks. The non-local entities may include any non-local entities as described herein. In a non-limiting embodiment, method 800 may include temporarily merging the plurality of local mesh networks with the central mesh network, wherein merging the plurality of local mesh networks comprises generating additional nodes for each non-local entity. In another non-limiting embodiment, method 800 may include to deleting the additional nodes once communication with the non-local entities are complete. Persons skilled in the art, upon reviewing the entirety of this disclosure, will be aware of the various functions of a mesh network for purposes as described herein.

Still referring to FIG. 8, method 800 may include generating on a computing device a first node of a multi node network. A computing device may include, but is not limited to, a flight controller, laptop, charging station, landing pad, smartphone, tablet, controller tower, and the like. A first node of a multi node network may include any computing device that may be configured to receive and transmit data to one or more other computing devices. Method 800 may further include generating on a computing device a second node of a multi node network. A computing device may include, but is not limited to, a flight controller, laptop, charging station, landing pad, smartphone, tablet, controller tower, and the like. A second node of a multi node network may include any computing device that may be configured to receive and transmit data to one or more other computing devices. In a non-limiting embodiment, method 800 may further include communication efficiency feedback data between a first node and second node of a multi node network. Communication efficiency feedback data may include signal strength, transmission times, error rate, physical trajectory, and the like. Method 800 may include updating as a function of communication efficiency feedback data an initial recipient node. An initial recipient node may include a node first transmitted to in a network. Method 800 may further include selecting a transmission pathway of nodes. Selecting a transmission pathway may include calculating a path of communication between one node and another node. Calculating a path of communication may include factors such as, but into limited to, node distance, number of node connections, node response time, node signal strength, node traffic, and the like. Persons skilled in the art, upon reviewing the entirety of this disclosure, will be aware of the various embodiments and methods for generating a multi node network for purposes as described herein.

Still referring to FIG. 8, method 800, at step 810, may include authenticating, by an authentication module of a computing device, each electric aircraft. The computing device may include any computing device as described herein. The authentication module may include any authentication module as described herein. In a non-limiting embodiment, authenticating may include any means for authentication as described herein. In another non-limiting embodiment, authenticating may include receiving, by the authentication module, a credential from an electric aircraft of the plurality of electric aircrafts, comparing the credential to an authorized credential stored within an authentication database, and bypassing authentication for the electric aircraft as a function of the comparison. Persons skilled in the art, upon reviewing the entirety of this disclosure, will be aware of the various embodiments and methods for authenticating an electric aircraft for purposes as described herein.

With continued reference to FIG. 8, method 800, at step 815, may include receiving, by a communication component of a plurality of communication components, a plurality of aircraft data. The communication component may include any communication component as described herein. The aircraft data may include any aircraft data as described herein. In a non-limiting embodiment, receiving the plurality of aircraft data may include sending and receiving signals comprising the aircraft data via a plurality of physical CAN bus units included in the communication components. The physical CAN bus unit may be consistent with any physical CAN bus unit as described herein. In another non-limiting embodiment, communication component may include a transceiver and/or ADS-B. Persons skilled in the art, upon reviewing the entirety of this disclosure, will be aware of the various embodiments of the communication component and various methods of receiving data for purposes as described herein.

Still referring to FIG. 8, method 800, at step 820, may include facilitating, as a function of the plurality of communication components, communication between the plurality of electric aircrafts. In a non-limiting embodiment, facilitating communication may include transmitting signals comprising the aircraft data from one communication component to another communication component. In a non-limiting embodiment, method 800 may include utilizing a remote user device operated by a fleet manager. The remote user device may be consistent with any remote user device as described herein. In a non-limiting embodiment, the fleet manager may oversee the communication between the electric aircrafts of the fleet. In a non-limiting embodiment, method 800 may include generating an aircraft data model depicting the aircraft data being communicated. The aircraft data model may include any aircraft data model as described herein. Persons skilled in the art, upon reviewing the entirety of this disclosure, will be aware of the various embodiments and methods of overseeing the communication of an electric aircraft fleet for purposes as described herein.

Still referring to FIG. 8, method 800, at step 825, may include recording, by a cloud database, the plurality of aircraft data. The cloud database may include any cloud database as described herein.

Figure 9:
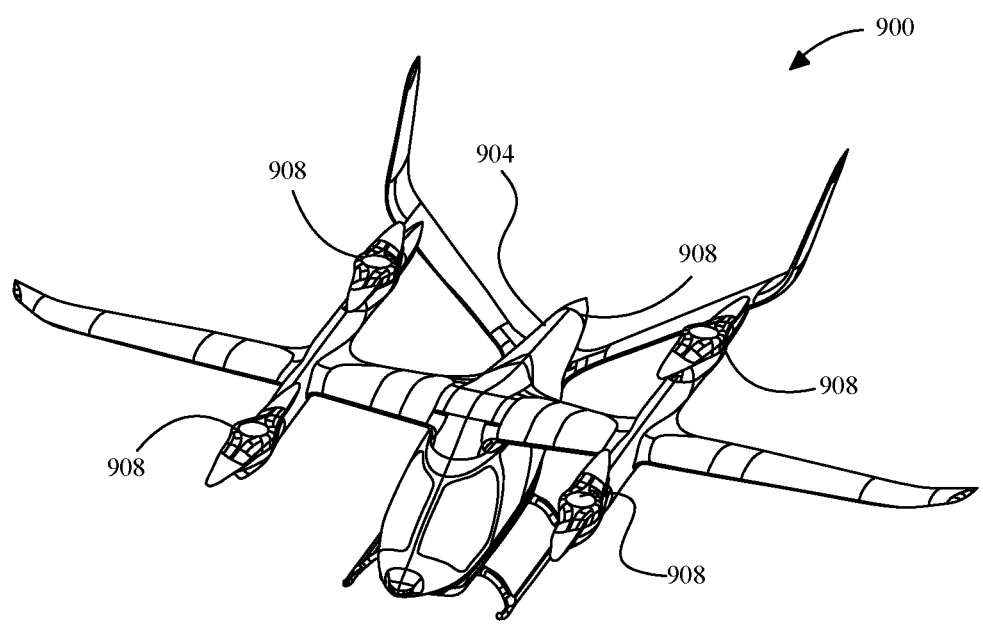
FIG. 9 is an illustration of an exemplary embodiment of an electric aircraft.

Referring now to FIG. 9, an exemplary embodiment of an electric aircraft 900, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 9, aircraft 900 may include an electrically powered aircraft. In embodiments, electrically powered aircraft may be an electric vertical takeoff and landing (eVTOL) aircraft. Aircraft 900 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 9.

Still referring to FIG. 9, aircraft 900 includes a fuselage 908. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 908 may include structural elements that physically support a shape and structure of an aircraft. Structural elements may take a plurality of forms, alone or in combination with other types. Structural elements may vary depending on a construction type of aircraft such as without limitation a fuselage 908. Fuselage 908 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

According to embodiments, and further referring to FIG. 9, fuselage 908 may include a semi-monocoque construction. Semi-monocoque construction, as used herein, is a partial monocoque construction, wherein a monocoque construction is describe above detail. In semi-monocoque construction, aircraft fuselage 908 may derive some structural support from stressed aircraft skin and some structural support from underlying frame structure made of structural elements. Formers or station frames can be seen running transverse to the long axis of fuselage 908 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 9, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 9, stressed skin, when used in semi-monocoque Still referring to FIG. 9, aircraft 900 includes a plurality of flight components 904. As used in this disclosure a "flight component" is a component that promotes flight and guidance of an aircraft. In an embodiment, flight components 904 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 9, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 900 may be incorporated.

In an embodiment and still referring to FIG. 9, plurality of flight components 904 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 30° from the longitudinal axis of aircraft 900. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 9, plurality of flight components 904 may include a pusher component 916. As used in this disclosure a "pusher component" is a component that pushes and/or thrusts an aircraft through a medium. As a non-limiting example, pusher component 916 may include a pusher propeller, a paddle wheel, a pusher motor, a pusher propulsor, and the like. Additionally, or alternatively, pusher flight component may include a plurality of pusher flight components. Pusher component 916 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 900 in a horizontal direction along a longitudinal axis. As a further non-limiting example, pusher component 916 may twist and/or rotate to pull air behind it and, at the same time, push aircraft 900 forward with an equal amount of force. In an embodiment, and without limitation, the more air forced behind aircraft, the greater the thrust force with which the aircraft is pushed horizontally will be. In another embodiment, and without limitation, forward thrust may force aircraft 900 through the medium of relative air. Additionally or alternatively, plurality of flight components 904 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 9, aircraft 900 may include a flight controller located within fuselage 908, wherein a flight controller is described in detail below, in reference to FIG. 9. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 90 and one or more airfoil shapes of the laterally extending elements, wherein an airfoil is described above in detail. As a further non-limiting example, flight controller may operate the fixed-wing flight capability as a function of reducing applied torque on lift propulsor component 912. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 916. For example, and without limitation, flight controller may increase a forward thrust of 1000 kN produced by pusher component 916 to a forward thrust of 1100 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 900. Inertia compensator may alternatively or additionally include any computing device used as an inertia compensator as described in U.S. Nonprovisional application Ser. No. 17/106,557 and entitled "SYSTEM AND METHOD FOR FLIGHT CONTROL IN ELECTRIC AIRCRAFT," the entirety of which is incorporated herein by reference.

In an embodiment, and still referring to FIG. 9, flight controller may be configured to perform a reverse thrust command. As used in this disclosure a "reverse thrust command" is a command to perform a thrust that forces a medium towards the relative air opposing the aircraft. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 9, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 10:
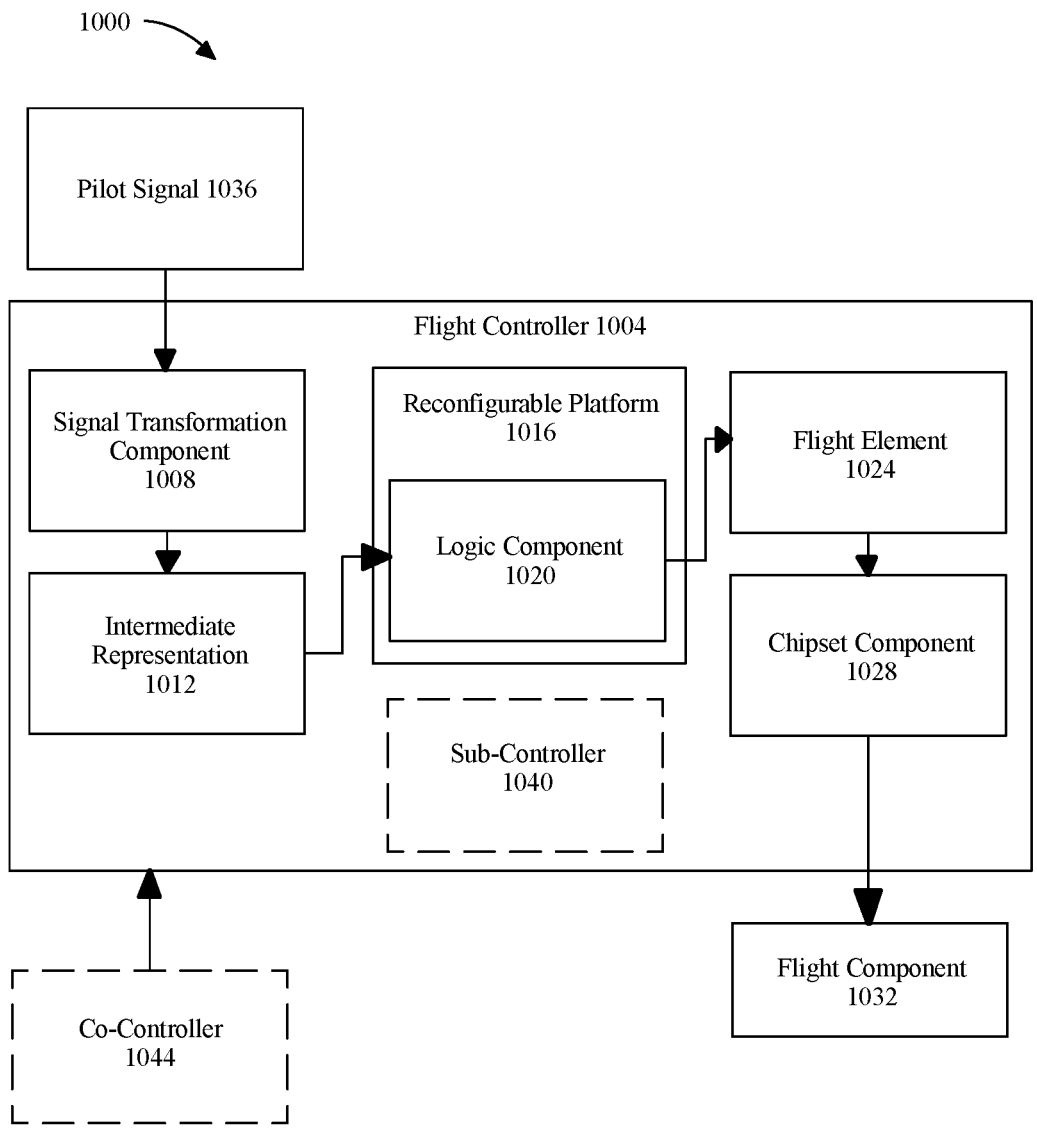
FIG. 10 is an illustration of an exemplary embodiment of a sensor suite in partial cut-off view.

Now referring to FIG. 10, an exemplary embodiment 1000 of a flight controller 1004 is illustrated. As used in this disclosure a "flight controller" is a computing device of a plurality of computing devices dedicated to data storage, security, distribution of traffic for load balancing, and flight instruction. Flight controller 1004 may include and/or communicate with any computing device as described in this disclosure, including without limitation a microcontroller, microprocessor, digital signal processor (DSP) and/or system on a chip (SoC) as described in this disclosure. Further, flight controller 1004 may include a single computing device operating independently, or may include two or more computing device operating in concert, in parallel, sequentially or the like; two or more computing devices may be included together in a single computing device or in two or more computing devices. In a non-limiting embodiment, system 100 may include a computing device wherein the computing device may include flight controller 1004 configured to facilitate communication between a plurality of aircrafts and their flight controllers. In embodiments, flight controller 1004 may be installed in an aircraft, may control the aircraft remotely, and/or may include an element installed in the aircraft and a remote element in communication therewith. In some embodiments, flight controller 1004 may be configured to generate a node as described in FIG. 1.

In an embodiment, and still referring to FIG. 10, flight controller 1004 may include a signal transformation component 1008. As used in this disclosure a "signal transformation component" is a component that transforms and/or converts a first signal to a second signal, wherein a signal may include one or more digital and/or analog signals. For example, and without limitation, signal transformation component 1008 may be configured to perform one or more operations such as preprocessing, lexical analysis, parsing, semantic analysis, and the like thereof. In an embodiment, and without limitation, signal transformation component 1008 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 1008 may include transforming one or more low-level languages such as, but not limited to, machine languages and/or assembly languages. For example, and without limitation, signal transformation component 1008 may include transforming a binary language signal to an assembly language signal. In an embodiment, and without limitation, signal transformation component 1008 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 10, signal transformation component 1008 may be configured to optimize an intermediate representation 1012. As used in this disclosure an "intermediate representation" is a data structure and/or code that represents the input signal. Signal transformation component 1008 may optimize intermediate representation as a function of a data-flow analysis, dependence analysis, alias analysis, pointer analysis, escape analysis, and the like thereof. In an embodiment, and without limitation, signal transformation component 1008 may optimize intermediate representation 1012 as a function of one or more inline expansions, dead code eliminations, constant propagation, loop transformations, and/or automatic parallelization functions. In another embodiment, signal transformation component 1008 may optimize intermediate representation as a function of a machine dependent optimization such as a peephole optimization, wherein a peephole optimization may rewrite short sequences of code into more efficient sequences of code. Signal transformation component 1008 may optimize intermediate representation to generate an output language, wherein an "output language," as used herein, is the native machine language of flight controller 1004. For example, and without limitation, native machine language may include one or more binary and/or numerical languages.

In an embodiment, and still referring to FIG. 10, flight controller 1004 may include a reconfigurable hardware platform 1016. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1016 may be reconfigured to enact any algorithm and/or algorithm selection process received from another computing device and/or created using machine-learning processes.

Still referring to FIG. 10, reconfigurable hardware platform 1016 may include a logic component 1020. As used in this disclosure a "logic component" is a component that executes instructions on output language. For example, and without limitation, logic component may perform basic arithmetic, logic, controlling, input/output operations, and the like thereof. Logic component 1020 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1020 may be organized according to Von Neumann and/or Harvard architecture as a non-limiting example. Logic component 1020 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 1020 may include one or more integrated circuit microprocessors, which may contain one or more central processing units, central processors, and/or main processors, on a single metal-oxide-semiconductor chip. Logic component 1020 may be configured to execute a sequence of stored instructions to be performed on the output language and/or intermediate representation 1012. Logic component 1020 may be configured to fetch and/or retrieve the instruction from a memory cache, wherein a "memory cache," as used in this disclosure, is a stored instruction set on flight controller 1004. Logic component 1020 may be configured to decode the instruction retrieved from the memory cache to opcodes and/or operands. Logic component 1020 may be configured to execute the instruction on intermediate representation 1012 and/or output language. For example, and without limitation, logic component 1020 may be configured to execute an addition operation on intermediate representation 1012 and/or output language.

In an embodiment, and without limitation, logic component 1020 may be configured to calculate a flight element 1024. As used in this disclosure a "flight element" is an element of datum denoting a relative status of aircraft. For example, and without limitation, flight element 1024 may denote one or more torques, thrusts, airspeed velocities, forces, altitudes, groundspeed velocities, directions during flight, directions facing, forces, orientations, and the like thereof. For example, and without limitation, flight element 1024 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1024 may denote that aircraft is following a flight path accurately and/or sufficiently.

In an embodiment, and still referring to FIG. 10, flight controller 1004 may be configured generate an autonomous function. As used in this disclosure an "autonomous function" is a mode and/or function of flight controller 1004 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1024. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1004 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1004 will control the ailerons and/or rudders. As used in this disclosure "non-autonomous mode" is a mode that denotes a pilot will control aircraft and/or maneuvers of aircraft in its entirety.

In an embodiment, and still referring to FIG. 10, flight controller 1004 may generate autonomous function as a function of an autonomous machine-learning model. As used in this disclosure an "autonomous machine-learning model" is a machine-learning model to produce an autonomous function output given flight element 1024 and a pilot signal 1036 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1036 may denote that a pilot is controlling and/or maneuvering ailerons, wherein the pilot is not in control of the rudders and/or propulsors. In an embodiment, pilot signal 1036 may include an implicit signal and/or an explicit signal. For example, and without limitation, pilot signal 1036 may include an explicit signal, wherein the pilot explicitly states there is a lack of control and/or desire for autonomous function. As a further non-limiting example, pilot signal 1036 may include an explicit signal directing flight controller 1004 to control and/or maintain a portion of aircraft, a portion of the flight plan, the entire aircraft, and/or the entire flight plan. As a further non-limiting example, pilot signal 1036 may include an implicit signal, wherein flight controller 1004 detects a lack of control such as by a malfunction, torque alteration, flight path deviation, and the like thereof. In an embodiment, and without limitation, pilot signal 1036 may include one or more explicit signals to reduce torque, and/or one or more implicit signals that torque may be reduced due to reduction of airspeed velocity. In an embodiment, and without limitation, pilot signal 1036 may include one or more local and/or global signals. For example, and without limitation, pilot signal 1036 may include a local signal that is transmitted by a pilot and/or crew member. As a further non-limiting example, pilot signal 1036 may include a global signal that is transmitted by air traffic control and/or one or more remote users that are in communication with the pilot of aircraft. In an embodiment, pilot signal 1036 may be received as a function of a tri-state bus and/or multiplexor that denotes an explicit pilot signal should be transmitted prior to any implicit or global pilot signal.

Still referring to FIG. 10, autonomous machine-learning model may include one or more autonomous machine-learning processes such as supervised, unsupervised, or reinforcement machine-learning processes that flight controller 1004 and/or a remote device may or may not use in the generation of autonomous function. As used in this disclosure "remote device" is an external device to flight controller 1004. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 10, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1004 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 10, flight controller 1004 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 1004. Remote device and/or FPGA may transmit a signal, bit, datum, or parameter to flight controller 1004 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1004 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 10, flight controller 1004 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 10, flight controller 1004 may include, but is not limited to, for example, a cluster of flight controllers in a first location and a second flight controller or cluster of flight controllers in a second location. Flight controller 1004 may include one or more flight controllers dedicated to data storage, security, distribution of traffic for load balancing, and the like. Flight controller 1004 may be configured to distribute one or more computing tasks as described below across a plurality of flight controllers, which may operate in parallel, in series, redundantly, or in any other manner used for distribution of tasks or memory between computing devices. For example, and without limitation, flight controller 1004 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

Still referring to FIG. 10, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 10, flight controller may include a sub-controller 1040. As used in this disclosure a "sub-controller" is a controller and/or component that is part of a distributed controller as described above; for instance, flight controller 1004 may be and/or include a distributed flight controller made up of one or more sub-controllers. For example, and without limitation, sub-controller 1040 may include any controllers and/or components thereof that are similar to distributed flight controller and/or flight controller as described above. Sub-controller 1040 may include any component of any flight controller as described above. Sub-controller 1040 may be implemented in any manner suitable for implementation of a flight controller as described above. As a further non-limiting example, sub-controller 1040 may include one or more processors, logic components and/or computing devices capable of receiving, processing, and/or transmitting data across the distributed flight controller as described above. As a further non-limiting example, sub-controller 1040 may include a controller that receives a signal from a first flight controller and/or first distributed flight controller component and transmits the signal to a plurality of additional sub-controllers and/or flight components.

Still referring to FIG. 10, flight controller may include a co-controller 1044. As used in this disclosure a "co-controller" is a controller and/or component that joins flight controller 1004 as components and/or nodes of a distributer flight controller as described above. For example, and without limitation, co-controller 1044 may include one or more controllers and/or components that are similar to flight controller 1004. As a further non-limiting example, co-controller 1044 may include any controller and/or component that joins flight controller 1004 to distributer flight controller. As a further non-limiting example, co-controller 1044 may include one or more processors, logic components and/or computing devices capable of receiving, processing, and/or transmitting data to and/or from flight controller 1004 to distributed flight control system. Co-controller 1044 may include any component of any flight controller as described above. Co-controller 1044 may be implemented in any manner suitable for implementation of a flight controller as described above.

In an embodiment, and with continued reference to FIG. 10, flight controller 1004 may be designed and/or configured to perform any method, method step, or sequence of method steps in any embodiment described in this disclosure, in any order and with any degree of repetition. For instance, flight controller 1004 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm that will be performed by a computing device/module to produce outputs 1108 given data provided as inputs 1112; this is in contrast to a non-machine learning software program where the commands to be executed are determined in advance by a user and written in a programming language.

Figure 11:
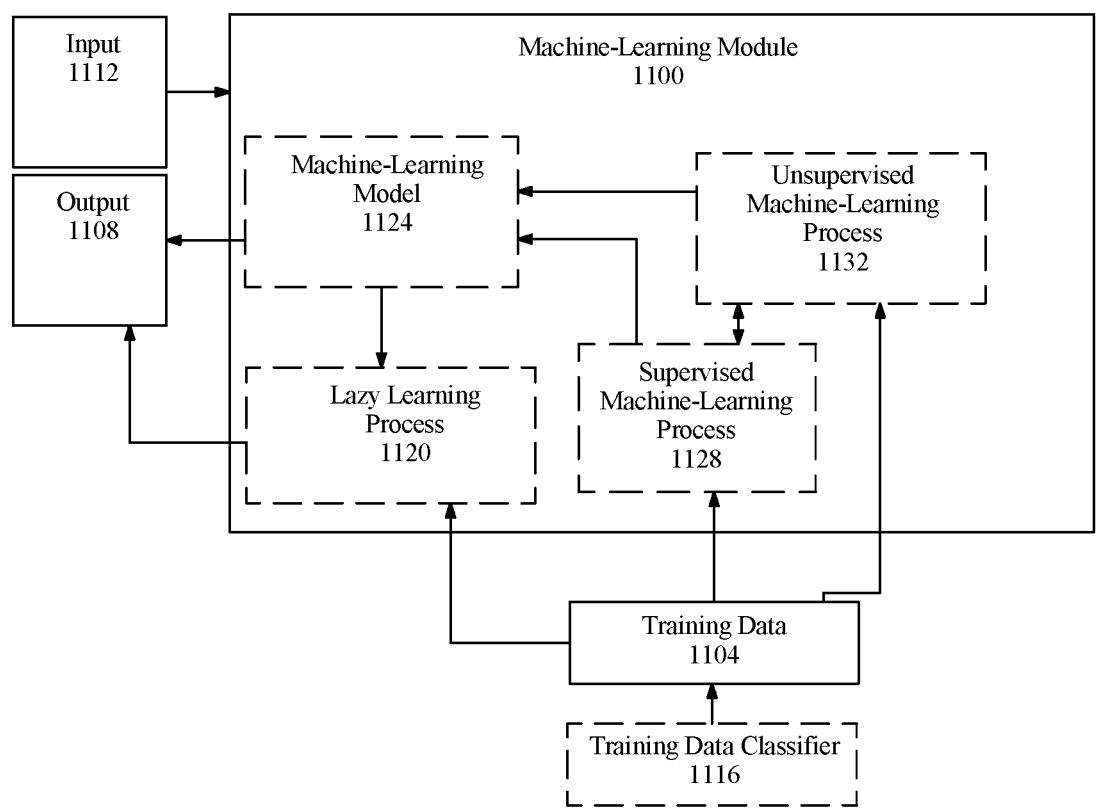
FIG. 11 is a block diagram of an exemplary machine-learning process.

Still referring to FIG. 11, "training data," as used herein, is data containing correlations that a machine-learning process may use to model relationships between two or more categories of data elements. For instance, and without limitation, training data 1104 may include a plurality of data entries, each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1100 may generate a classifier using a classification algorithm, defined as a processes whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1116 may classify elements of training data to data transmission pathways.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 11, machine-learning processes as described in this disclosure may be used to generate machine-learning models 1124. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include node connections as described above as inputs, data transmission pathways as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
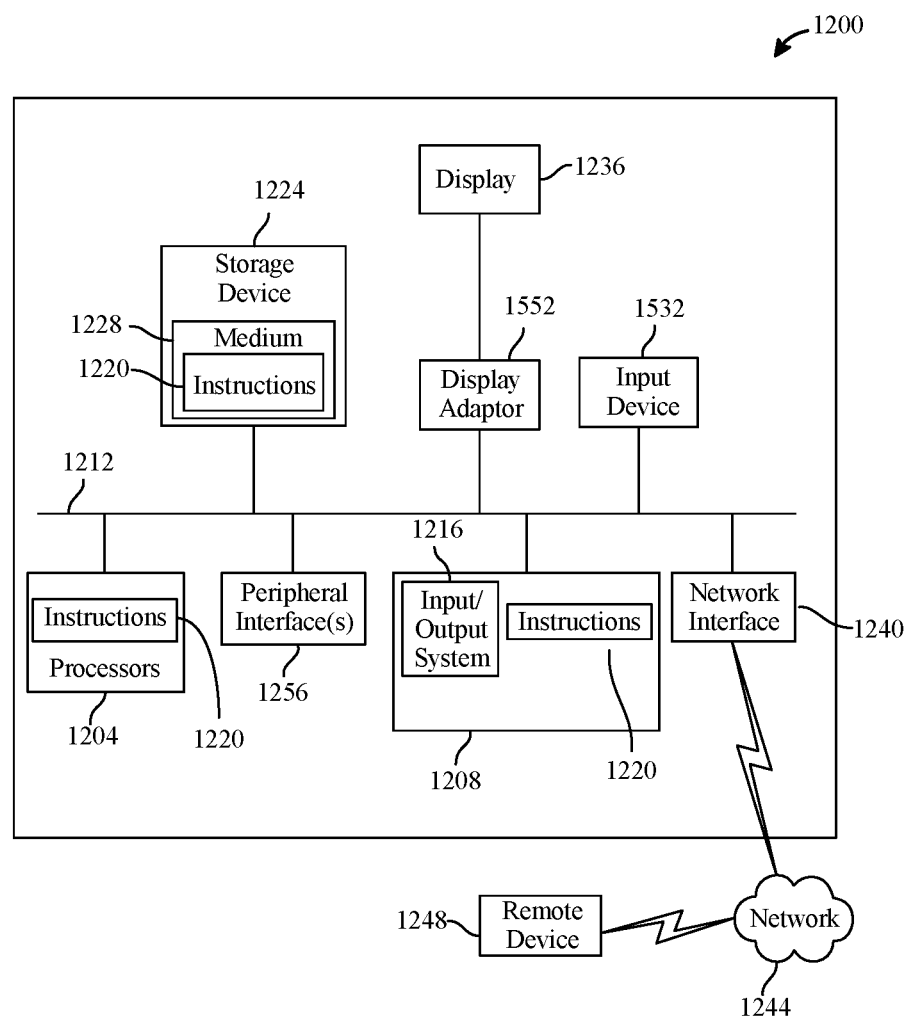
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIRE-WIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for swarm communication for an electric aircraft fleet, the system comprising:
    a computing device communicatively connected to a mesh network configured to connect a plurality of electric aircraft to each other, wherein the computing device comprises:
        an authentication module, wherein the authentication module is configured to authenticate each electric aircraft;
        at least a node, wherein the at least a node comprises at least a communication component, wherein the at least a communication component is configured to:
            receive a plurality of aircraft data, wherein aircraft data comprises component state data; and
            facilitate communication between the plurality of electric aircraft as a function of the communication satisfying a communication threshold, wherein the communication threshold comprises an error rate; and
        a cloud database, wherein the cloud database is configured to record the plurality of aircraft data.

2. The apparatus of claim 1, wherein the mesh network comprises:
    a plurality of local mesh networks, wherein each local network comprises a plurality of nodes representing non-local entities; and
    a central mesh network, wherein the central mesh network is configured to communicate with the plurality of nodes representing non-local entities as a function of the plurality of local mesh networks.

3. The apparatus of claim 2, wherein the central mesh network comprises a computing device configured to temporarily merge the plurality of local mesh networks with the central mesh network, wherein merging the plurality of local mesh networks comprises generating additional nodes for each non-local entity.

4. The apparatus of claim 3, wherein the central mesh network is further configured to delete the additional nodes once communication with the non-local entities are complete.

5. The apparatus of claim 1, wherein the computing device is further configured to assign a communication component of the plurality of communication components to an electric aircraft of the plurality of the electric aircrafts.

6. The apparatus of claim 5, wherein computing device is further configured to:
    receive, as a function of a communication component, an aircraft data from its assigned electric aircraft; and
    transmit the aircraft data to a second electric aircraft as a function of the communication component assigned to the second electric aircraft.

7. The apparatus of claim 1, wherein the authentication module is further configured to:
    receive a credential from an electric aircraft of the plurality of electric aircrafts;

compare the credential to an authorized credential stored within an authentication database; and bypass authentication for the electric aircraft as a function of the comparison.

8. The apparatus of claim 1, wherein the computing device further comprises a user device, wherein the user device is configured to manually facilitate communication between the plurality of electric aircrafts.

9. The apparatus of claim 8, wherein the computing device is further configured to:

generate an aircraft data model as a function of the aircraft data; and display the aircraft data model onto the user device.

10. The apparatus of claim 1, wherein the electric aircraft fleet further comprises a manned electric vertical take-off and landing aircraft.

11. A method for swarm communication for an electric aircraft fleet, the method comprising:

connecting, as a function of a mesh network, a plurality of electric aircrafts with each other;

authenticating, by an authentication module of a computing device, each electric aircraft;

receiving, by at least a node comprising a communication component of a plurality of communication components, a plurality of aircraft data, wherein aircraft data comprises component state data;

facilitating, by the communication component, communication between the plurality of electric aircrafts as a function of the communication satisfying a communication threshold, wherein the communication threshold comprises an error rate; and recording, by a cloud database, the plurality of aircraft data.

12. The method of claim 11, wherein the mesh network comprises:

a plurality of local mesh networks, wherein each local network comprises a plurality of nodes representing non-local entities; and a central mesh network, wherein the central mesh network is configured to communicate with the plurality of nodes representing non-local entities as a function of the plurality of local mesh networks.

13. The method of claim 12, wherein the method further comprises:

temporarily merging the plurality of local mesh networks with the central mesh network, wherein merging the plurality of local mesh networks comprises generating additional nodes for each non-local entity.

14. The method of claim 13, wherein the method further comprises deleting the additional nodes once communication with the non-local entities are complete.

15. The method of claim 11, wherein the method further comprises assigning, by the computing device, a communication component of the plurality of communication components to an electric aircraft of the plurality of the electric aircrafts.

16. The method of claim 15, wherein the method further comprises:

receiving, by the computing device, an aircraft data from its assigned electric aircraft as a function of a communication component; and transmitting the aircraft data to a second electric aircraft as a function of the communication component assigned to the second electric aircraft.

17. The method of claim 11, wherein the method further comprises:

receiving, by the authentication module, a credential from an electric aircraft of the plurality of electric aircrafts;

comparing the credential to an authorized credential stored within an authentication database; and bypassing authentication for the electric aircraft as a function of the comparison.

18. The method of claim 11, wherein the method further comprises:

manually facilitating, by a user device of the computing device, communication between the plurality of electric aircrafts.

19. The method of claim 18, wherein manually facilitating further comprises:

generating, by the computing device, an aircraft data model as a function of the aircraft data; and displaying, by the user device, the aircraft data model onto the user device.

20. The method of claim 11, wherein the electric aircraft fleet further comprises a manned electric vertical take-off and landing aircraft.

* * * * *